(12) United States Patent
Park

(10) Patent No.: US 12,130,671 B2
(45) Date of Patent: Oct. 29, 2024

(54) STRUCTURE INCLUDING INTERNAL GEARS AND ELECTRONIC DEVICE INCLUDING THE SAME

(71) Applicant: SAMSUNG ELECTRONICS CO., LTD., Suwon-si (KR)

(72) Inventor: Daehyeong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 17/527,416

(22) Filed: Nov. 16, 2021

(65) Prior Publication Data
US 2022/0206544 A1 Jun. 30, 2022

Related U.S. Application Data

(63) Continuation of application No. PCT/KR2021/015391, filed on Oct. 29, 2021.

(30) Foreign Application Priority Data

Dec. 24, 2020 (KR) .................. 10-2020-0183095

(51) Int. Cl.
G06F 1/16 (2006.01)
E05D 3/12 (2006.01)

(52) U.S. Cl.
CPC .......... *G06F 1/1681* (2013.01); *E05D 3/122* (2013.01); *G06F 1/1616* (2013.01); *G06F 1/1652* (2013.01)

(58) Field of Classification Search
CPC ..... G06F 1/1681; G06F 1/1652; G06F 1/1616
See application file for complete search history.

(56) References Cited

U.S. PATENT DOCUMENTS 9,115,750 B2    8/2015  Park
9,845,625 B2   12/2017  Park
10,845,850 B1*  11/2020  Kang ............... H04M 1/022
(Continued)

FOREIGN PATENT DOCUMENTS

CN    111862798    10/2020
CN    211623936    10/2020
(Continued)

OTHER PUBLICATIONS

Search Report and Written Opinion dated Feb. 18, 2022 in counterpart International Patent Application No. PCT/KR2021/015391.
(Continued)

*Primary Examiner* — Anthony Q Edwards
(74) *Attorney, Agent, or Firm* — NIXON & VANDERHYE P.C.

(57) ABSTRACT

Disclosed are an hinge structure including: a first housing, a second housing, a hinge, and a flexible display, the hinge structure includes: a first rotation part, a second rotation part, a fixing bracket, and a structure, the structure includes a first rotary shaft, a second rotary shaft, a first main gear formed in the first rotary shaft, a second main gear formed in the second rotary shaft, and at least one idle gear disposed between the first main gear and the second main gear, and the first gear may be geared with the first main gear, and the second gar may be geared with the second main gear, and a foldable electronic device including the same.

22 Claims, 23 Drawing Sheets

(56) References Cited

U.S. PATENT DOCUMENTS

| | | | |
|---|---|---|---|
| 11,231,754 B2 | 1/2022 | Kang et al. | |
| 11,503,723 B2* | 11/2022 | Yang | G06F 1/1641 |
| 11,550,358 B2 | 1/2023 | Cheng | |
| 11,662,781 B2 | 5/2023 | Kang et al. | |
| 2013/0322004 A1 | 5/2013 | Park | |
| 2019/0166703 A1* | 5/2019 | Kim | H05K 5/0226 |
| 2020/0264673 A1 | 8/2020 | Kim et al. | |
| 2021/0076511 A1* | 3/2021 | Yang | G09F 9/301 |
| 2021/0318723 A1* | 10/2021 | Cheng | H04M 1/022 |
| 2021/0373614 A1 | 12/2021 | Kim et al. | |
| 2022/0046813 A1 | 2/2022 | Cheng et al. | |
| 2023/0041469 A1 | 2/2023 | Yang et al. | |
| 2023/0111233 A1 | 4/2023 | Cheng | |
| 2023/0251692 A1 | 8/2023 | Kang et al. | |

FOREIGN PATENT DOCUMENTS

| | | |
|---|---|---|
| KR | 10-2002-0012881 A | 2/2002 |
| KR | 10-2012-0049762 A | 5/2012 |
| KR | 10-2019-0143161 | 12/2019 |
| KR | 10-2020-0018176 | 2/2020 |
| KR | 10-2020-0101241 | 8/2020 |
| KR | 10-2020-0117773 A | 10/2020 |
| KR | 10-2020-0117777 | 10/2020 |
| KR | 10-2021-0031041 A | 3/2021 |
| WO | 2020/173341 | 9/2020 |

OTHER PUBLICATIONS

Extended European Search Report dated Jan. 3, 2024 issued in European Patent Application No. 21911224.0.

* cited by examiner

STRUCTURE INCLUDING INTERNAL GEARS AND ELECTRONIC DEVICE INCLUDING THE SAME

CROSS-REFERENCE TO RELATED APPLICATIONS

This application is a continuation of International Application No. PCT/KR2021/015391 designating the United States, filed on Oct. 29, 2021, in the Korean Intellectual Property Receiving Office and claiming priority to Korean Patent Application No. 10-2020-0183095, filed on Dec. 24, 2020, the disclosures of which are incorporated by reference herein in their entireties.

BACKGROUND

Field

The disclosure relates to a hinge structure, and various embodiments of the disclosure relate to a hinge structure including internal gears and an electronic device including the same.

Description of Related Art

A portable electronic device, such as a smartphone, may provide various functions, such as voice communication, playback of videos, and search through the internet, based on various kinds of applications. The user may intend to use the above-mentioned functions through a wider screen. However, as the screen becomes larger, portability may deteriorate. Accordingly, a foldable portable electronic device that may increase portability by utilizing a folded structure has been developed.

In the foldable electronic device, adjacent housings and a hinge structure are connected to each other, and the housings are rotated at specific angles while the hinge structure supports the housings.

The foldable electronic device requires various components to perform a rotation operation using a hinge structure. Furthermore, in the foldable electronic device, a display is folded through a rotation of the hinge structure, and a folded part of the display may collide with an internal structure of the foldable electronic device. Accordingly, a space for preventing and/or avoiding collision of the display is required.

SUMMARY

Embodiments of the disclosure provide a hinge structure including internal gears that may implement a slim foldable electronic device by further simplifying the hinge structure of the foldable electronic device and facilitate assembly by providing a simplified assembly structure, and an electronic device including the same.

According to an example embodiment of the disclosure, a foldable electronic device includes: a first housing, a second housing, a hinge structure including a hinge connecting the first housing and the second housing, and a flexible display, at least a portion of which is positioned on the first housing, the second housing, and the hinge structure, the hinge structure may include a first rotation part coupled to the first housing and having a first gear on one side of the first rotation part, a second rotation part coupled to the second housing and having a second gear on one side of the second rotation part, a fixing bracket, to which the first rotation part and the second rotation part are coupled, and a structure, at least a portion of which is seated on one side of the fixing bracket, the structure may include: a first rotary shaft, a second rotary shaft, a first main gear formed in the first rotary shaft, a second main gear formed in the second rotary shaft, and at least one idle gear disposed between the first main gear and the second main gear, wherein the first gear may be geared with the first main gear, and the second gar may be geared with the second main gear.

The hinge structure and the electronic device including the same according to various example embodiments make the foldable electronic device slimmer and reduce the weight thereof by employing the simplified hinge structure.

Furthermore, various example embodiments provide ease of assembly through the simplified hinge structure and help secure a gap for preventing and/or avoiding a collision.

Furthermore, various example embodiments support a stable hinge operation while decreasing manufacturing costs by removing a pin structure for interworking a center bar for protecting the display, the rotation parts, and the arms.

Furthermore, various example embodiments of the disclosure may increase a torque using gear ratios, by improving a size of the cam structure, and prevent and/or reduce a collision of the display and surrounding structures by improving restrictions on sizes of the idle gears through securing of spaces at the folded part of the foldable electronic device.

Other various purposes and effects provided by the electronic device including the hinge structure according to various embodiments may be mentioned according to the embodiments of the detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
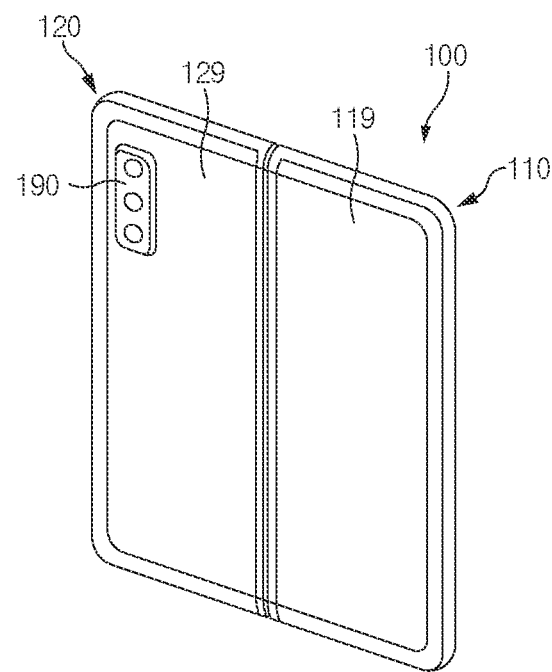
FIG. 1A is a perspective view illustrating an example of a rear surface of an electronic device according to various embodiments.

Hereinafter, various example embodiments of the disclosure will be described with reference to the accompanying drawings. Accordingly, those of ordinary skill in the art will recognize that various modifications, equivalents, and/or alternatives on the various embodiments described herein can be variously made without departing from the scope and spirit of the disclosure. With regard to the description of drawings, similar components may be denoted by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. When an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for", "having the capacity to", "designed to", "adapted to", "made to", or "capable of". The term "configured to (or set to)" must not refer only to "specifically designed to" in hardware. Instead, the expression "a device configured to" may refer to the device being "capable of" operating together with another device or other components. CPU, for example, a "processor configured to perform A, B, and C" may refer, for example, to a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this disclosure are used to describe various example embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. According to occasions, even a term defined in the disclosure cannot be construed to exclude the embodiments of the disclosure.

An electronic device according to various embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, wearable devices, or the like. According to various embodiments of the disclosure, the wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), implantable types (e.g., implantable circuits), or the like.

Hereinafter, electronic devices according to various embodiments of the disclosure will be described with reference to the accompanying drawings. The term "user" used herein may refer to a person who uses an electronic device or may refer to a device (e.g., an artificial electronic device) that uses an electronic device.

Figure 1B:
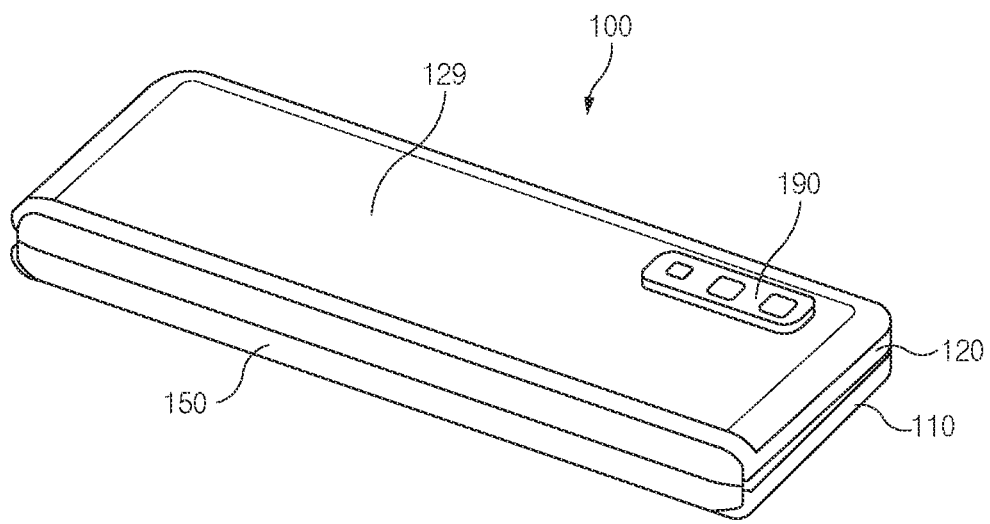
FIG. 1B is a perspective view illustrating an example of a folded state of an electronic device according to various embodiments.

FIG. 1A is a perspective view illustrating an example of a rear surface of an electronic device according to various embodiments. FIG. 1B is a perspective view illustrating an example of a folded state of an electronic device according to various embodiments FIG. 2 is an exploded perspective view illustrating of an electronic device according to various embodiments.

Figure 2:
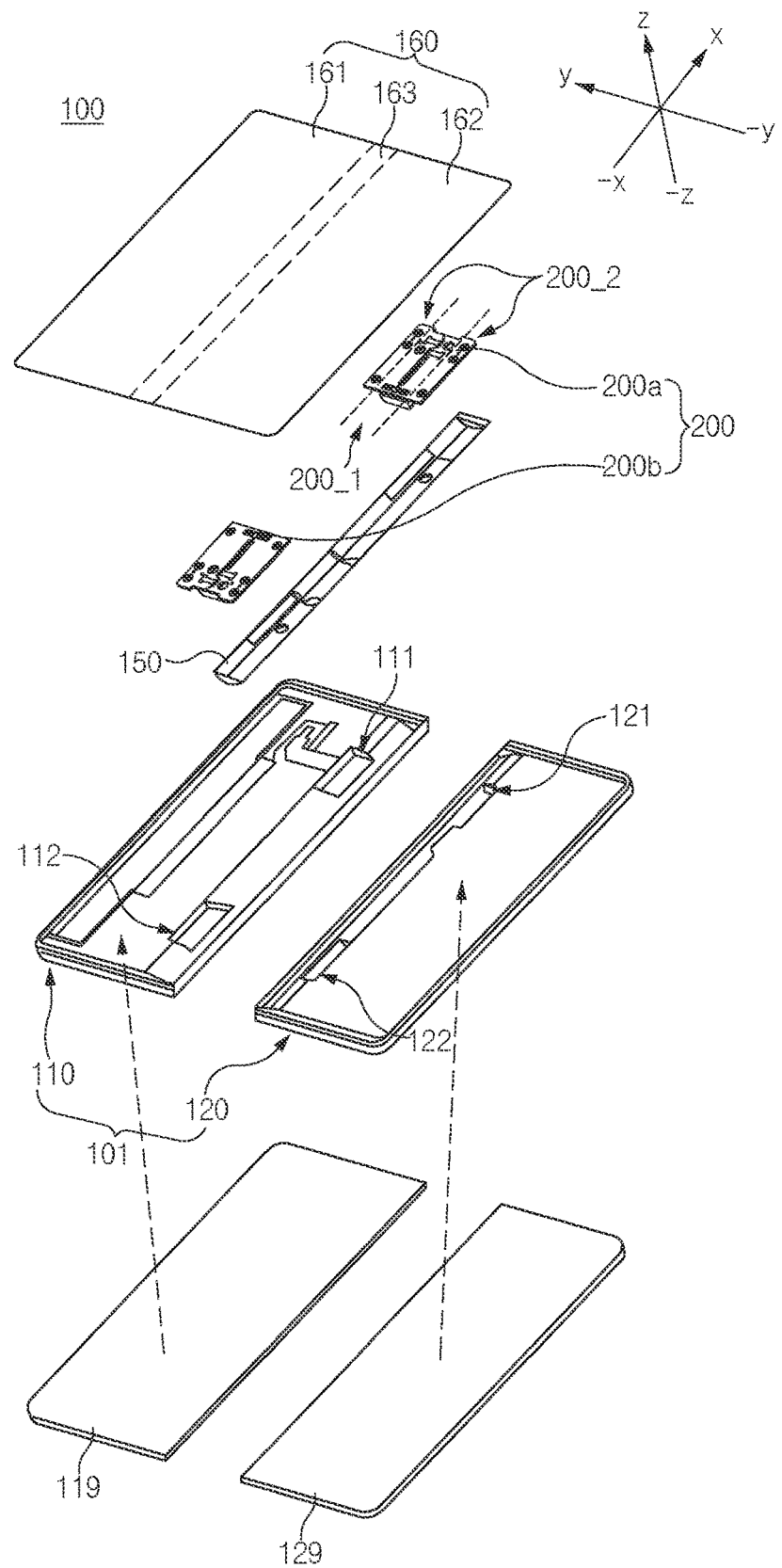
FIG. 2 is an exploded perspective view illustrating an electronic device according to various embodiments.

Referring to FIGS. 1A, 1B and 2, an electronic device 100 (or a foldable electronic device, a flexible display, or a flexible & foldable electronic device) according to an embodiment, a housing 101 (e.g., a first housing 110 and a second housing 120), a hinge housing 150, a hinge structure (e.g., including a hinge) 200 (e.g., a first hinge structure 200a and a second hinge structure 200b), and a display 160 (or a flexible display or a display module), at least a portion of which is disposed on a forward direction (e.g., the z axis direction) of the hinge structure 200 (or hinge member, or hinge units). Additionally or alternatively, the electronic device 100 may further include a first cover 119 that covers at least a portion of a rear surface (e.g., a surface that faces the −z axis direction) of the first housing 110, and a second cover 129 that covers at least a portion of a rear surface (e.g., a surface that faces the −z axis direction) of the second housing 120. Furthermore, the first cover 119 may integrally form a rear surface of the first housing 110, and the second cover 129 may integrally form a rear surface of the second housing 120.

The housing 101 may be at least a pair of housings that may be rotated about a specific axis. For example, the housing 101 may include the first housing 110 and the second housing 120. The first housing 110 may be disposed to be continuous to the second housing 120 (e.g., when a central portion 163 of the display 160 is spread flat or the housing 101 is in an unfolded state), or may be disposed in parallel to the second housing 120 according to a disposition form thereof. Furthermore, when the central portion 163 of the display 160 is folded, one surface of the first housing 110 may be disposed to face one surface of the second housing 120.

The first housing 110, for example, may be configured such that at least a portion thereof is formed of a metallic material or at least a portion thereof is formed of a nonmetallic material. For example, the first housing 110 may be formed of a material having a specific strength to support at least a portion of the display 160. An area (e.g., at least a portion of a first part 161 of the display 160 and at least a portion of one side of the central portion 163) of the display 160 may be disposed at at least a portion of the front surface of the first housing 110. Furthermore, at least a portion of the first housing 110 may be bonded to the first part 161 of the display 160. Furthermore, at least a portion of an edge of the front surface of the first housing 110 may be bonded to an edge of the first part 161 of the display 160. Furthermore, at least a portion the front surface (e.g., a surface in the z axis direction) of the first housing 110 may be bonded to at least a portion of the first part 161 of the display 160. In this regard, a bonding layer may be disposed at at least a portion between the first housing 110 and the first part 161 of the display 160. At least a portion of the inside of the first housing 110 may be provided such that the interior thereof is empty or may be provided such that the interior thereof is empty after the first housing 110 is coupled to the first cover 119 so that an electronic element (e.g., an element, such as a printed circuit board, at least one processor mounted on the printed circuit board, at least one memory, or a battery) that is necessary for driving the electronic device 100 may be disposed.

According to various embodiments, edge ends (edge ends of the remaining three sites except for an edge that faces the second housing 120 in the unfolded state of the electronic device 100) of the first housing 110 may protrude by a specific height further than a bottom surface of a central part of the housing to surround an edge of at least one side of the display 160. Furthermore, side walls, at least portions of which face an edge of the display 160, may be disposed at at least a portion of the edge end of the first housing 110. Side walls formed at at least a portion of an edge of the first housing 110 may have specific heights at the remaining three edges, except for the edge that faces the second housing 120. An edge portion of the first housing 110, which faces the second housing 120, may include a recessed part, at least a portion of which has a specific curvature such that at least a portion of the hinge housing 150 is disposed. For example, the first housing 110 may include a first stepped portion 111, at which a portion of the first hinge structure 200a located in the hinge housing 150 is located, at an edge portion that faces the second housing 120, and a second stepped portion 112, at which a portion of the second hinge structure 200b located in the hinge housing 150 is disposed.

According to various embodiments, the second housing 120, according to disposition thereof, may be disposed in parallel to the first housing 110 or may be disposed such that at least one surface thereof faces one surface (e.g., a surface on which the display 160 is disposed) of the first housing 110. For example, the second housing 120 may be formed of the same material as the first housing 110. Because the second housing 120 is disposed to be symmetrical to the first housing 110 leftwards and rightwards or upwards and downwards, at least a portion (e.g., at least a portion of the second part 162 of the display 160 and at least a portion of an opposite side of the central part 163) of the remaining area of the display 160, except for the area disposed in the first housing 110, may be disposed to be supported by a front surface of the second housing 120. Furthermore, at least a portion of the second housing 120 may be bonded to the second part 162 of the display 160. Furthermore, an edge of the front surface of the first housing 120 may be bonded to an edge of the second part 162 of the display 160. Furthermore, one side of a lower portion of the front surface of the second housing 120 may be bonded to one side of the second part 162 of the display 160. In this regard, a bonding layer may be disposed at at least a portion between the second housing 120 and the second part 162 of the display 160. At least a portion of the inside of the second housing 120 may be configured such that the interior thereof is empty similarly to the first housing 110 or may be configured such that the interior thereof is empty after the second housing 120 is coupled to the second cover 129 so that electronic elements that are necessary for driving the electronic device 100 may be disposed. According to various embodiments, a camera 190 may be disposed on the rear surface of the second housing 120, and in relation to disposition of the camera 190, a hole, in which the camera 190 may be disposed, may be formed in the second cover 129.

According to various embodiments, edge ends (edge ends of the remaining three sites except for an edge that faces the first housing 110) of the second housing 120 may protrude by a specific height further than a bottom surface of a central part of the second housing 120 to surround an edge of an opposite side of the display 160. Furthermore, similarly to the side walls formed in the first housing 120, side walls, at least portions of which face the edge of the display 160, may be disposed at at least a portion of the edge end of the second housing 120. Side walls formed at at least a portion of an edge of the second housing 120 may have specific heights at the remaining three edges, except for the edge that faces the first housing 110.

According to various embodiments, a portion of the second housing 120, which faces the first housing 110, may include a recessed part, at least a portion of which has a specific curvature such that the hinge housing 150 is disposed. For example, the second housing 120 may include a third stepped portion 121, at which a portion of the hinge housing 150, to which the first hinge structure 200a is mounted, is disposed at an edge portion that faces the first housing 110, and a fourth stepped portion 122, at which a portion of the hinge housing 150, on which the second hinge structure 200b is mounted, is disposed.

According to various embodiments, the electronic device 100 may include at least one sensor disposed on one side of an interior of the first housing 110 or the second housing 120. The sensor, for example, may include at least one of a proximity sensor, an illumination sensor, an iris sensor, an image sensor (or a camera), or a fingerprint sensor.

According to various embodiments, the hinge housing 150 may be covered by one side of the first housing 110 or the second housing 120 (e.g., an unfolded state of the housing 101) or be exposed to the outside (e.g., a folded state of the housing 101) according to the folded or unfolded state of the foldable electronic device 100. For example, when the first housing 110 and the second housing 120 are disposed parallel to each other, the hinge housing 150 may be covered by the first housing 110 and the second housing 120. When one surface of the first housing 110 and one surface of the second housing 120 are disposed to face each other, the hinge housing 150 may be disposed such that at least a portion thereof is exposed to the outside at edges (e.g., edges of the first housing 110 and the second housing 120, which face each other in the unfolded state) of one side of the first housing 110 and the second housing 120. A side wall may be disposed in the hinge housing 150 such that at least a portion of an interior thereof is empty and at least portions of opposite edges (e.g., edges in the x axis and −x axis directions) are closed. At least one boss coupled to the first hinge structure 200a and the second hinge structure 200b may be disposed at at least a portion of the inner surface of the hinge housing 150.

According to various embodiments, at least a portion of the display 160 may be flexible. According to an embodiment, the display 160 may include the first part 161 or the first area disposed on the first housing 110, the second part 162 or the second area disposed on the second housing 120, and the central part 163 or a central area that are adjacent to the first housing 110 and the second housing 120 and corresponds to the location of the hinge structure 200 when the electronic device 100 is in the unfolded state. According to various embodiments, the entire display 160 may be flexible. Furthermore, at least a portion of the central part 163 of the display 160 may be flexible. The central part 163 of the display 160 may be disposed not to be bonded to the first housing 110 and the second housing 120. For example, the central part 163 of the display 160 may be spaced apart from the front surface (e.g., a surface in the z axis direction) of the hinge structure 200 during the folding operation of the electronic device 100. The first part 161 of the display 160 may be bonded to at least a portion of the first housing 110, and the second part 162 of the display 160 may be bonded to at least a portion of the second housing 120. In this regard, bonding layers may be disposed in at least a partial area between the display 160 and the first housing 110 and in at least a partial area between the display 160 and the second housing 120.

The display 160 may include various layers. For example, the display 160 may include an external protection layer (or a glass layer or a polymer layer) of a specific size having a specific transparency, a display panel layer disposed under the external protection layer to display a screen, and a first rear surface layer disposed under the display panel layer. The rear surface layer may include an impact absorbing layer (or an embossing layer) and a heat dissipating layer (or a metal sheet layer). Additionally or alternatively, the first rear surface layer may further include an electromagnetic induction panel (e.g., a digitizer). According to various embodiments, the display 160 may further include a second rear surface layer disposed under the first rear surface layer. At least a portion of the second rear surface layer may include at least one metal layer (or a metal sheet) formed of a metallic material. The second rear surface layer may include a specific pattern (e.g., a lattice pattern or a slit pattern) such that at least a portion thereof may be bent. Furthermore, at least a portion of the second rear surface may be formed of another material (e.g., a polymer material, rubber, or a leather material) that may be bent.

According to various embodiments, at least one hinge structure 200 may be disposed with respect to the x axis direction. For example, the hinge structure 200 may include a first hinge structure 200a and a second hinge structure 200b. The hinge structure 200 may include a first part 200_1 disposed on an inside of the hinge housing 150, and a second part 200_2 disposed on the hinge housing 150 or corresponding to a peripheral structure (e.g., a structure coupled to the first housing 110 and the second housing 120) that does not overlap the hinge housing 150 with respect to the z axis. At least a portion of the first hinge structure 200a of the first part of the hinge structure 200 may be disposed on a first inner side (e.g., an area biased to the x axis direction in the hinge housing 150) of the hinge housing 150. At least a portion of the second hinge structure 200b of the first part of the hinge structure 200 may be disposed on a second inner side (e.g., an area biased to the −x axis direction in the hinge housing 150) of the hinge housing 150. At least a portion of the second part of the hinge structure 200 may be rotated in correspondence to rotation of the first housing 110 and the second housing 120. At least one of the first hinge structure 200a and the second hinge structure 200b according to an embodiment may include interworking gears, and internal gears that are inscribed with the interworking gears.

Figure 3:
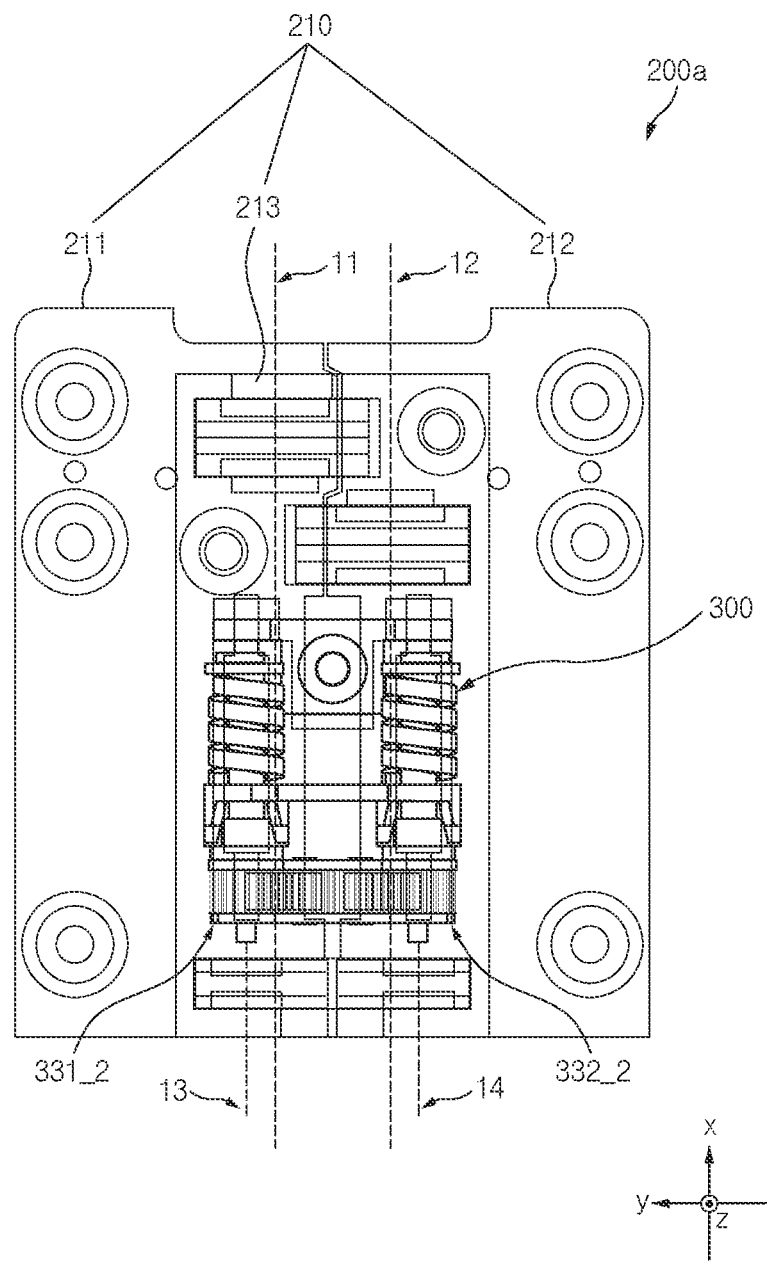
FIG. 3 is a diagram illustrating a surface of a first hinge structure including an internal gear according to various embodiments.

FIG. 3 is a diagram illustrating a surface of a first hinge structure including an internal gear according to various embodiments. Prior to a description, the hinge structure illustrated in FIG. 3 may be at least one of the hinge structure 200a or the second hinge structure 200b described above in FIG. 2, and the first hinge structure 200a and the second hinge structure 200b may have the same structure and locations, at which they are disposed, may be different. Accordingly, in the following description, the first hinge structure 200a will be described as a representative example.

Referring to FIGS. 2 and 3, the first hinge structure 200a according to various embodiments may include a rotation structure 210 (e.g., a fixing bracket 213, a first rotation part 211 (or a first rotary portion), and a second rotation part 212 (or a second rotary portion)), and a torque generating structure 300 (or an elastic structure or a frictional force generating structure, hereinafter, referred to as a torque generating structure) that provides a torque while allowing the first rotation part 211 and the second rotation part 212 to interwork with each other).

At least a portion of the fixing bracket 213 may be formed of a material of a specific strength or more, for example, a metallic material or a plastic material having a strength corresponding to that of a specific metallic material to endure hinge operations of the first rotation part 211 and the second rotation part 212. The fixing bracket 213 may be seated on and fixed to one side of the hinge housing 150. In this regard, at least a portion of a part of the fixing bracket 213, which is seated in the hinge housing 150 may include a shape (e.g., a curved shape) corresponding to an inner surface of the hinge housing 150. The fixing bracket 213 may be coupled such that the first rotation part 211 and the second rotation part 212 are rotated within specific angle ranges, respectively. The first rotation part 211 may be coupled to one side of the fixing bracket 213, and be rotated with respect to a first axis 11. The second rotation part 212 may be coupled to an opposite side of the fixing bracket 213, and be rotated with respect to a second axis 12. The first axis 11 and the second axis 12 may be spaced apart from each other by a specific distance with respect to the y axis. According to an embodiment, the torque generating structure 300 may be inserted into and fixed to one side of the fixing bracket 213.

The torque generating structure 300 may provide a torque (or a frictional force) to the first rotation part 211 and the second rotation part 212. In this regard, the torque generating structure 300 may include an elastic member disposed in a first rotary shaft (or a first shaft) in which a first main gear 331_2 is formed (or the first main gear provided separately may be coupled to the first rotary shaft and the first main gear may be fixed to a specific location of the first rotary shaft), and an elastic member disposed in a second rotary shaft (or a second shaft) in which a second main gear 332_2 is formed (or the second main gear provided separately may be coupled to the second rotary shaft and the second main gear may be fixed to a specific location of the second rotary shaft). It is illustrated in the drawings that the torque generating structure 30 includes a spring type elastic member, but the disclosure is not limited thereto. For example, the elastic member disposed in the torque generating structure 300 may include a spring type elastic member and a leaf spring type elastic member. The torque generating structure 300 may include at least one cam assembly to provide a torque or a frictional force. The torque generating structure 300 may include shafts to which the elastic member and the cam assembly are coupled, and the shafts may be rotated about a third axis and a fourth axis. The third axis 13 and the fourth axis 14 may be spaced apart from each other by a specific distance with respect to the y axis. A distance between the third axis 13 and the fourth axis 14 may be larger than a distance between the first axis 11 and the second axis 12. The third axis 13 and the fourth axis 14 may be closer to the rear surface of the display 160 than the first axis 11 and the second axis 12 with respect to the z axis. The torque generating structure 300 may include interworking gears related to associated operations of the first rotation part 211 and the second rotation part 212.

Figure 4A:
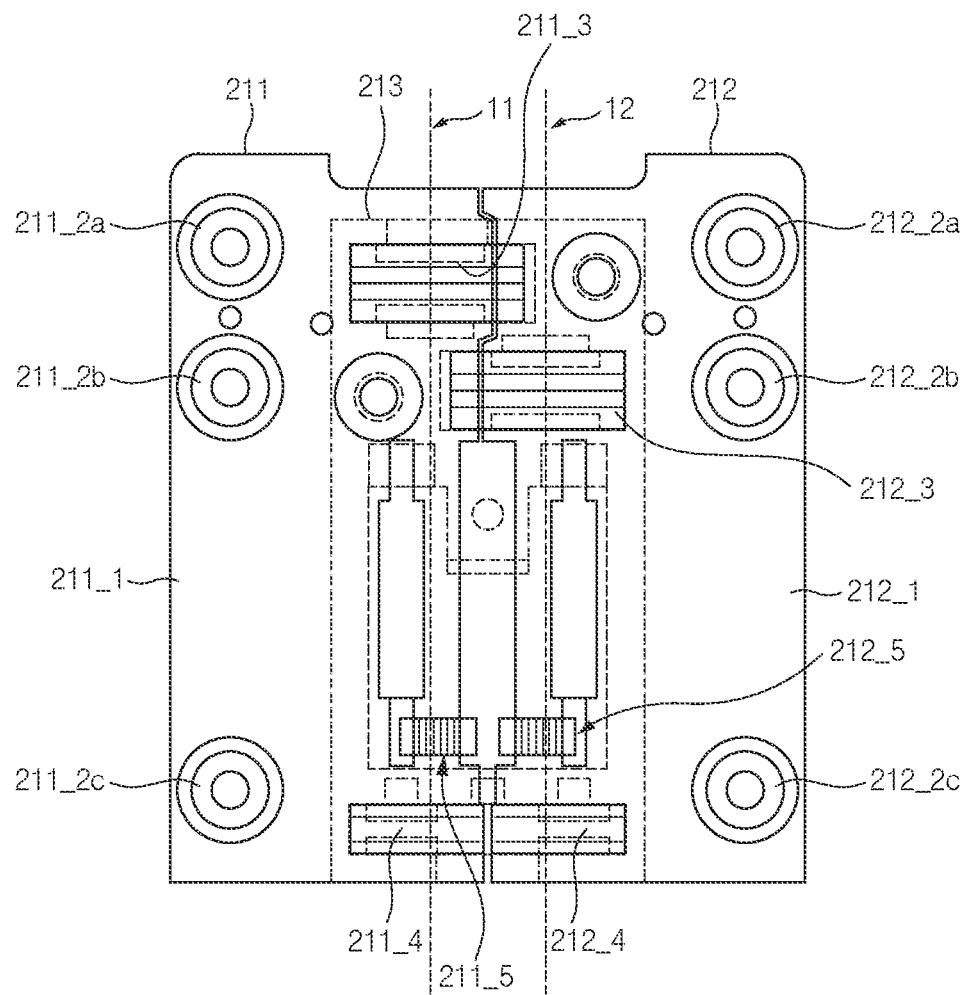
FIG. 4A is a diagram illustrating a coupling state of rotation parts and a fixing bracket of a first hinge structure according to various embodiments.
Figure 4B:
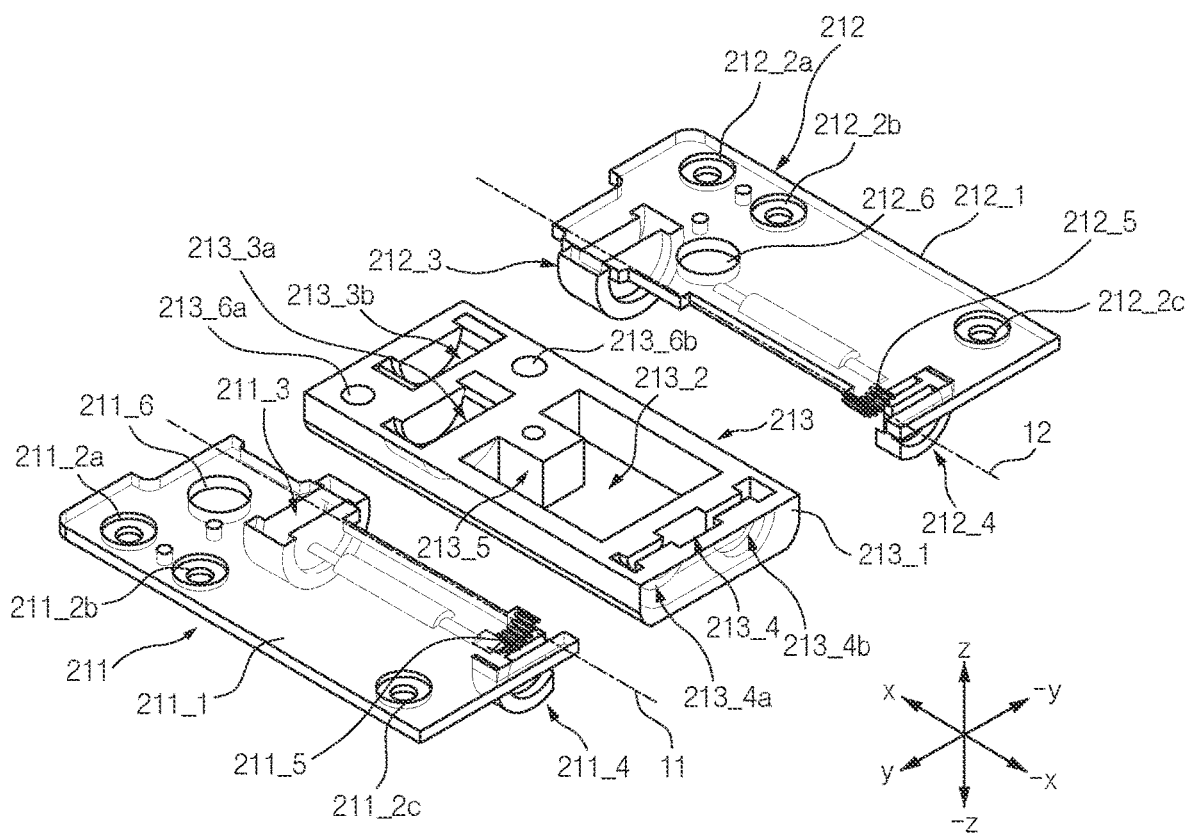
FIG. 4B is an exploded perspective view illustrating of rotation parts and a fixing bracket of a first hinge structure in a first direction according to various embodiments.
Figure 4C:
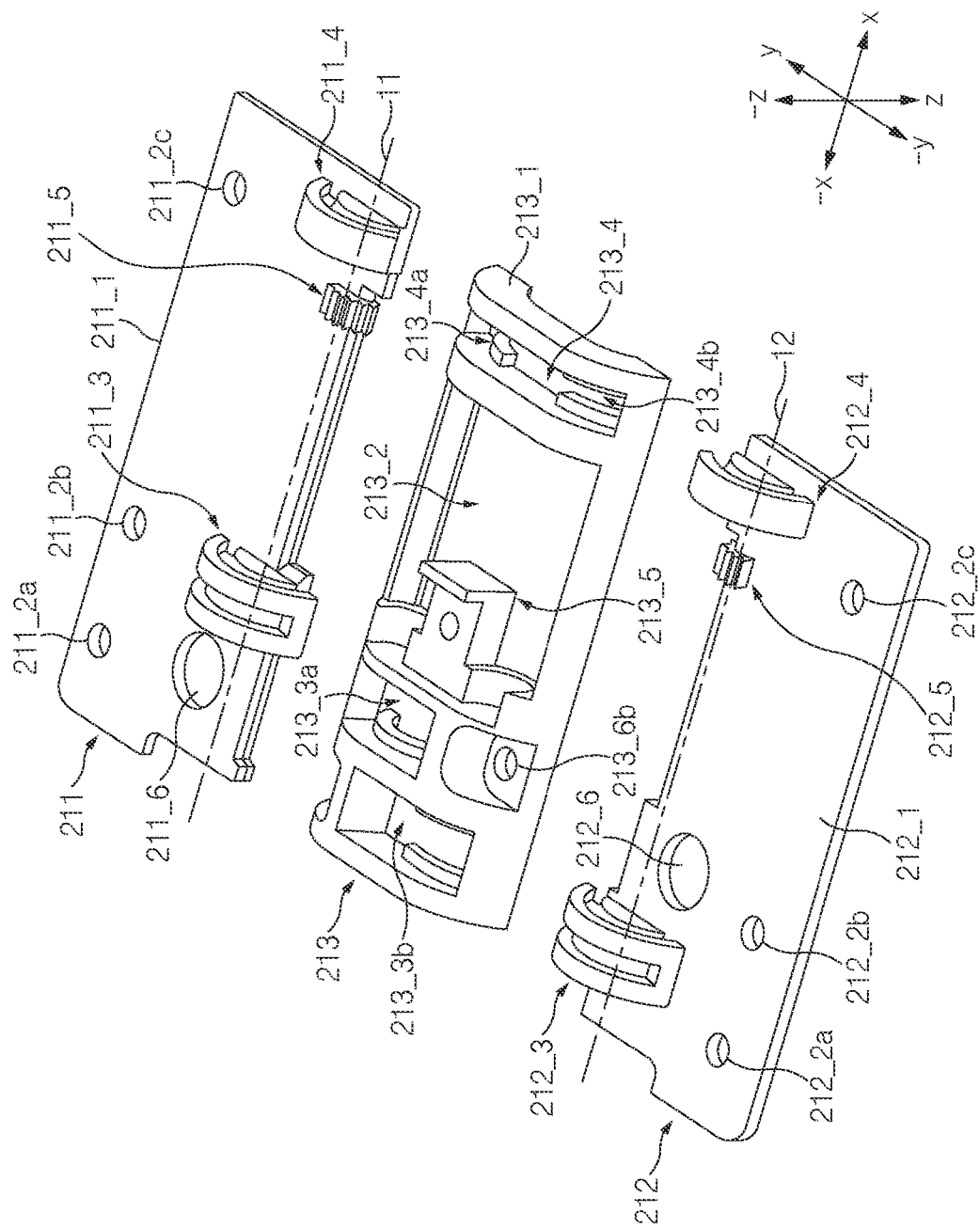
FIG. 4C is an exploded perspective view illustrating rotation parts and a fixing bracket of a first hinge structure in a second direction according to various embodiments.

FIG. 4A is a diagram illustrating a coupling state of rotation parts and a fixing bracket of a first hinge structure according to various embodiments. FIG. 4B is an exploded perspective view rotation parts and a fixing bracket of a first hinge structure in a first direction according to various embodiments. FIG. 4C is an exploded perspective view illustrating rotation parts and a fixing bracket of a first hinge structure in a second direction according to various embodiments.

Referring to FIGS. 2, 3, 4A, 4B and 4C, the first hinge structure 200a may at least include the fixing bracket 213, the first rotation part 211, and the second rotation part 212.

The fixing bracket 213 may include a bracket body 213_1, a first rail hole 213_3a and a second rail hole 213_3b formed at edges thereof in the x axis direction, a bracket fixing part 213_5, a structure seating hole 213_2, a common rail hole 213_4, and hinge housing coupling holes 213_6a and 213_6b.

A length of the bracket body 213_1 in the x axis direction may be larger than a length of the bracket body 213_1 in the y axis direction, and at least a portion of a cross-section thereof in the z axis direction may include a curve. For example, a whole shape of the bracket body 213_1 may have a semi-cylindrical shape. A first rail hole 213_3a, a second rail hole 213_3b, and a common rail hole 213_4, to which one side (e.g., the first rail 211_3 and the second rail 211_4) of the first rotation part 211 and one side (e.g., the third rail 212_3 and the fourth rail 212_4) of the second rotation part 212 are coupled, may be disposed in the bracket body 213_1. A structure seating hole 213_2, in which the torque generating structure 300 is seated, may be disposed at a central portion of the bracket body 213_1. The bracket fixing part 213_5 may be disposed on one side of the structure seating hole 213_2, and the bracket fixing part 213_5 may be fixed to the hinge housing 150 through a coupling member (e.g., a screw). At least some configurations of the torque generating structure 300, for example, recesses, in which the rotary shafts may be inserted and fixed, may be disposed on opposite sides of the bracket fixing part 213_5.

A center bracket 343 disposed in the torque generating structure 300 may be arranged at an upper portion (e.g., at least a portion in the z axis direction) of the bracket fixing part 213_5, and a coupling member (e.g., a screw) may be disposed to pass through at least a portion of a hole formed in the center bracket 343 and a hole formed at a central portion of the bracket fixing part 213_5. Coupling members may be inserted into the hinge housing coupling holes 213_6a and 213_6b, and the hinge housing coupling holes 213_6a and 213_6b may be fixed. The hinge housing coupling holes 213_6a and 213_6b may include a first hinge housing coupling hole 213_6a disposed in parallel to the second rail hole 213_3b on the y axis, and a second hinge housing coupling hole 213_6b disposed in parallel to the first rail hole 213_3a on the y axis. The hinge housing coupling holes 213_6a and 213_6 may extend in the z axis direction.

The first rail hole 213_3a may be engraved in a half moon shape, and a wing part may be formed at an upper end (an edge in the z axis direction) thereof. Wing parts may be formed on opposite sides (e.g., the x axis direction and the −x axis direction) of the first rail hole 213_3a, and may function to guide the first rail 211_3. The first rail hole 213_3a may be formed adjacent to the second rail hole 213_3b, may be disposed in parallel to the second rail hole 213_3b with respect to the y axis, and may be disposed such that portions thereof are alternately disposed with respect to the x axis.

The second rail hole 213_3b may be engraved in a half moon shape similarly to the first rail hole 213_3a, and a wing part may be formed at an upper end (an edge in the z axis direction) thereof. Wing parts may be formed on opposite sides (e.g., the x axis direction and the −x axis direction) of the second rail hole 213_3b, and may function to guide the second rail 211_4. In the illustrated drawings, it is shown by way of non-limiting example that the two rail holes 213_3b are further biased to the x axis direction as compared with the first rail hole 213_3a, but the disclosure is not limited thereto. For example, locations of the first rail hole 213_3a and the second rail hole 213_3b may be exchanged according to locations of the first rail 211_3 formed in the first rotation part 211 and the second rail 211_4 formed in the second rotation part 212.

The common rail hole 213_4 may be biased to a-x axis edge of the bracket body 213_1. The common rail hole 213_4 may be an opening that connects the y axis, the −z axis, and the −y axis, and the second rail 211_4 of the first rotation part 211 may be inserted into the common rail hole 213_4 at an y axis edge in the −y axis direction, and the fourth rail 212_4 of the second rotation part 212 may be inserted into the common rail hole 213_4 in the y axis direction. When the foldable electronic device 100 is in the unfolded state, a −y axis edge of the second rail 211_4 and a y axis edge of the fourth rail 212_4 may be disposed to face each other. In this regard, the common rail hole 213_4 may include a first guide 213_4a formed to be biased to a y axis edge, and a second guide 213_4b formed to be biased to a −y axis edge. The first guide 213_4a may guide a hinge operation of the second rail 211_4, and the second guide 213_4b may guide a hinge operation of the fourth rail 212_4. Recesses, into which some (e.g., the idle gears) of the interworking gears disposed in the torque generating structure 300 and sides of the rotary shafts may be inserted, may be formed on one surface of the side wall (e.g., a portion of the bracket body 213_1) forming the common rail hole 213_4, which faces the x axis.

At least a portion of the first rotation part 211 may be formed of the same material as that of the fixing bracket 213 or a metallic material having a specific strength or more. Furthermore, if necessary, at least a portion of the first rotation part 211 may include a plastic structure (or a plastic injection-molded product). The first rotation part 211 may include a first rotation body 211_1 formed of a plate, first housing coupling holes 211_2a, 211_2b, and 211_2c formed on one side of the first rotation body 211_1 and formed to cross the z axis and the −z axis, a first rail 211_3 coupled to the first rail hole 213_3a formed in the fixing bracket 213 in relation to the hinge operation of the first rotation part 211, a second rail 211_4 coupled to the common rail hole 213_4 formed in the fixing bracket 213, a first internal gear 211_5 geared with some configurations (e.g., sides of the interworking gears) of the torque generating structure 300, and a first opening 211_6t that exposes the first hinge housing coupling hole 213_6a formed in the fixing bracket 213 in the z axis direction. The first opening 211_6 may be at least larger than the first hinge housing coupling hole 213_6a.

The first housing coupling holes 211_2a, 211_2b, and 211_2c formed in the first rotary body 211_1, for example, may include three holes disposed to be spaced apart from a y axis edge of the first rotation body 211_1 by a specific interval. At least a portion of the y axis edge of the first rotation body 211_1 may be seated at the first stepped portion 111 formed in the first housing 110. A plurality of recesses punched in the −z axis direction may be formed in the first stopped portion 111, and the plurality of recesses may be aligned with the first housing coupling holes 211_2a, 211_2b, and 211_2c. Additionally, the foldable electronic device 100 may further include coupling members (e.g., screws) that pass through the first housing coupling holes 211_2a, 211_2b, and 211_2c to be coupled to the plurality of recesses.

The first rail 211_3 is continuous to the −y axis from the y axis via the −z axis, and at least a portion of the first rail 211_3 may have a half moon shape. For example, the first rail 211_3 may be disposed to protrude in the −z axis direction of the first rotation body 211_1. The first rail 211_3 may be stepped in the x axis and the −x axis. Accordingly, at least a portion of a z axis cross-section of the first rail 211_3 may have a "T" or inverse "T" shape. The first rail 211_3 may be rotated within a specific angle range while not deviating in the z axis direction while being coupled to the wing part formed in the first rail hole 213_3a. The first rail 211_3 may be rotated about the first axis 11. The first rail 211_3 may be aligned with the second rail 211_4 with respect to the first axis 11. The first rail 211_3 having an area that is wider or larger than that of the second rail 211_4 may be inserted into the first rail hole 213_3a of the fixing bracket 213 more stably and may be prevented and/or avoided from being separated in the z axis direction during a hinge operation, as compared with the second rail 211_4.

The second rail 211_4 may have a shape that is the same as a partial shape of the first rail 211_3. For example, the second rail 211_4, similarly to the first rail 211_3, may protrude in the −z axis direction while being continuous to the −y axis from the y axis via the −z axis, and a −y axis edge portion thereof may have a half moon shape that is cut in a vertical direction (e.g., the z axis direction). The second rail 211_4 may be coupled to the wing part formed to be biased in the y axis direction in the common rain hole 213_4 and be rotated in a specific angle range while not deviating in the z axis direction. The second rail 211_3 may be rotated about the first axis 11 in the same way as the first rail 211_3. The second rail 211_4 may have the same shape and size as those of the first rail 211_3, except for a partially cut portion. The second rail 211_4 may support the hinge operation of the first rotation body 211_1 together with the first rail 211_3, and may be rotated while having a locus that is similar to or the same as that of the first rail 211_2. The foldable electronic device 100 may improve a distortion problem of the first housing during a hinge operation in preparation for an environment that uses one rail, by performing the hinge operation based on the first rail 211_3 and the second rail 211_4. The first rail 211_3 having a size that is larger than that of the second rail 211_4 may stably couple the first rotation part 211 to the fixing bracket 213 and may be prevented and/or avoided from being separated from the fixing bracket 213 during the hinge operation, and the second rail 211_4 may function to uniformly disperse a pressure during rotation of the first rotation part 2112 while assisting the first rail 211_3 and being rotated along the common rail hole 213_4 of the fixing bracket 213. In this regard, the first rail 211_23 and the second rail 211_4 may be disposed to be spaced apart from each other by a specific interval in the x axis direction.

The first internal gear 211_5 (or the first gear) may include a boss that protrudes in the −z axis direction similarly to the first rail 211_3 or the second rail 211_4, and a gear pattern formed at at least a portion of the boss. At least a portion of the gear pattern of the first internal gear 211_5, for example, may be disposed to face the −z axis direction, and may be geared with sides of the interworking gears from the z axis in the −z axis direction. Because the first rotation part 211 is hinged at a specific angle, the gear pattern, for example, may be formed at a half moon or fan-shaped boss of 0 to 90 degrees or more or 0 to 180 degrees. The first internal gear 211_5 may be rotated about the first axis 11 within a specific angle range. Furthermore, a rotary shaft of the first internal gear 211_5 may be positioned on the first axis 11 that is the same as those of the first rail 211_3 and the second rail 211_4. In this regard, the first internal gear 211_5 may be disposed between the first rail 211_3 and the second rail 211_4, on the x axis. According to various embodiments, at least a portion of the first internal gear 211_5 may include a gear pattern disposed in the z axis direction. In this case, at least a portion of the first internal gear 211_5 may be geared with the −z axis direction of the interworking gear (e.g., the first main gear 331_2).

The second rotation part 212 may have a structure that is partially symmetrical to the first rotation part 211, and may have a similar or same size. For example, the second rotation part 212 may include a second rotation body 212_1, a second housing coupling holes 212_2a, 212_2b, and 212_2c), a third rail 212_3, a fourth rail 212_4, a second internal gear 212_5, and a second opening 212_6. The second opening 212_6 may have the same size as that of the first opening 211_6. For example, the second opening 212_6 may have a size that is equal to or greater than a size of the second hinge housing coupling hole 213_6b. The second opening 212_6 may expose the second hinge housing coupling hole 213_6b formed in the fixing bracket 213 in the z axis direction to provide a passage, into which a coupling member may be inserted.

The second rotation body 212_1 may have a structure that is symmetrical to the first rotation body 211_1 of the first rotation part 211. For example, the second housing coupling holes 212_2a, 212_2b, and 212_2c may be disposed at a −y axis edge of the second rotation body 212_1. At least a portion of the second rotation body 212_1, in which the second housing coupling holes 212_2a, 212_2b, and 212_2c may be seated at the third stepped portion 121 formed in the second housing 120. The foldable electronic device 100 may fix the second rotation body 212_1 to the third stepped portion 121 through separate coupling members (e.g., screws) and the second housing coupling holes 212_2a, 212_2b, and 212_2c.

The third rail 212_3, in relation to the hinge operation of the second rotation part 212, may be coupled to the second rail hole 213_3b formed in the fixing bracket 213. The third rail 212_3 may have a structure and a size that are similar to or the same as those of the first rail 211_3 of the first rotation part 211, and may be disposed to be further biased to an x axis edge as compared with the first rail 211_3 in an aspect of location. The third rail 212_3 may be rotated about the second axis 12 within a specific angle range. A location of the second rotation body 212_1 of the third rail 212_3 may be different from a location of the first rotation body 211_1 of the first rail 211_3 with respect to the x axis (or the fixing bracket 213).

The fourth rail 212_4 may have a structure that is the same as or similar to that of the second rail 211_4. The fourth rail 212_4 may be disposed at a location that is symmetrical to the second rail 211_4 with respect to the x axis. The fourth rail 212_3 may be hinged about the second axis 11 in the same way as the third rail 211_3. The fourth rail 212_4, similarly to the second rail 211_4, may be coupled to the common rail hole 213_4 formed in the fixing bracket 213. The fourth rail 212_4 may face one side of the second rail 211_4 according to an unfolding state of the foldable electronic device 100, and may be hinged to be spaced apart from the second rail 211_4 according to a folding operation.

The second internal gear 212_5 (or the second gear) may be geared with a configuration (e.g., a portion of the interworking gear on an opposite side of the second main gear 332_2) of the torque generating structure 300. The second internal gear 212_5 may have a size that is the same as or similar to the first internal gear 211_5 of the first rotation part 211, and may have a gear ratio with the second main part 332_2, which is the same as or similar to a gear ratio of the first internal gear 211_5 and the first main gear 331_2. The second internal gear 212_5 may be disposed at a location that is symmetrical to the first internal gear 211_5 of the first rotation part 211 with respect to the x axis. When the first internal gear 211_5 (or the second internal gear 212_5) is replaced by a circular gear, a size of the first internal gear 211_5 (or the second internal gear 212_5) may be larger than a size of the first main gear 331_2 (or the second main gear 332_2). According to various embodiments, in the same angle range, the number of teeth of the first internal gear 211_5 (or the second internal gear 212_5) may be larger than the number of teeth of the first main gear 311_2 (or the second main gear 312_2). Furthermore, a linear distance (e.g., a radius) from a center of the first internal gear 211_5 (or the second internal gear 212_5) to an outside thereof, at which the gear pattern is formed, may be larger than a linear distance (e.g., a radius of the first main gear 311_2) from a center of the first main gear 311_2 (or the second main gear 312_2) to an outside thereof. The first main gear 311_2 may have a size that is larger than that of the idle gears 321 and 322.

Figure 5A:
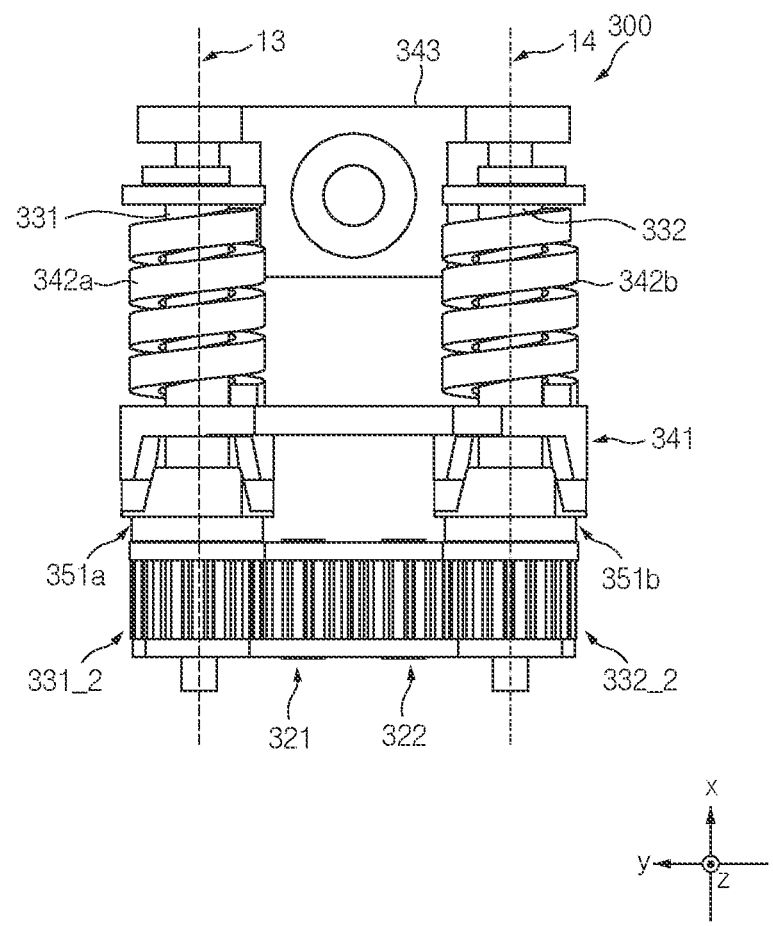
FIG. 5A is a diagram illustrating a coupling state of a torque structure of a first hinge structure, which provides a torque, according to various embodiments.
Figure 5B:
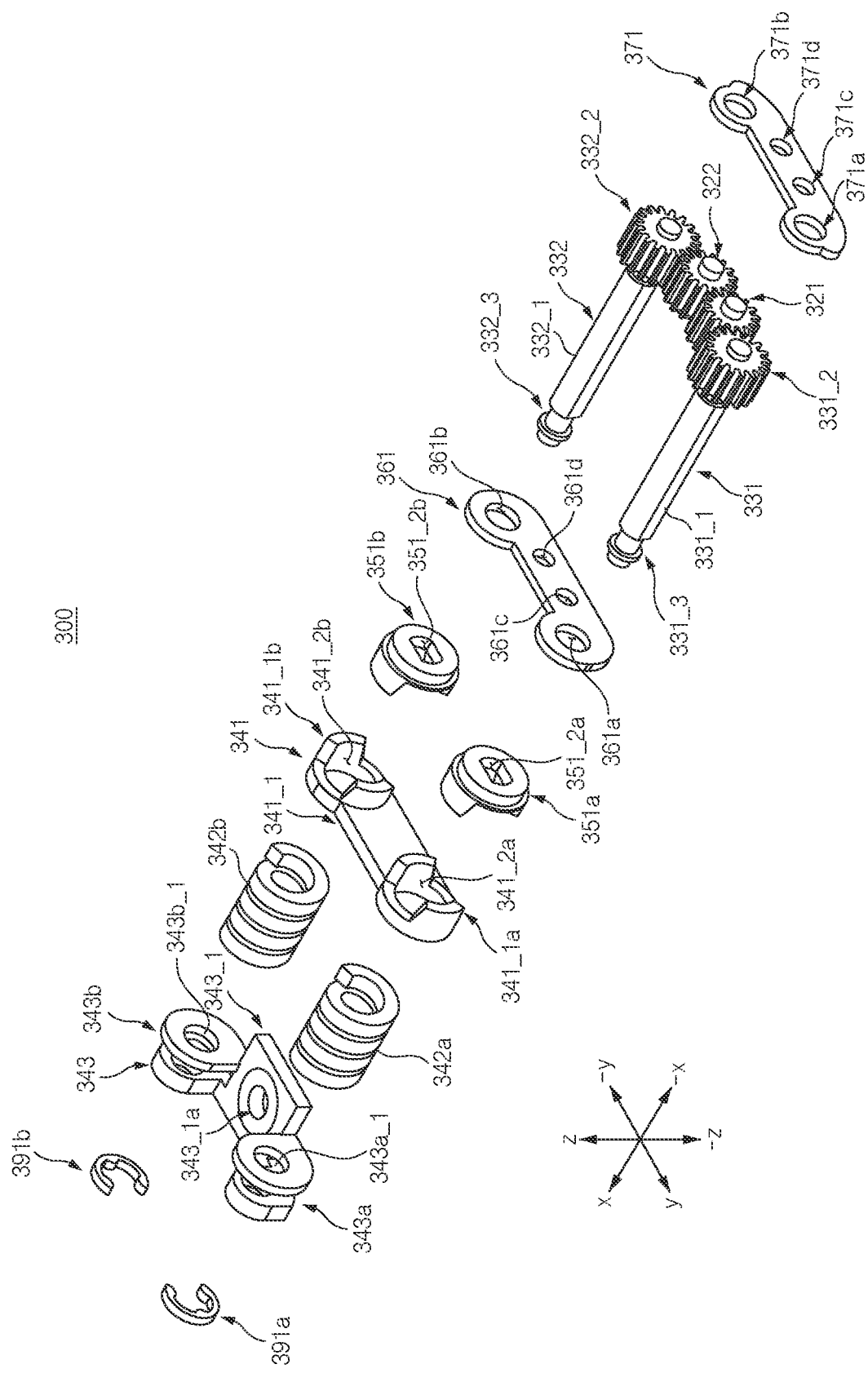
FIG. 5B is an exploded perspective view illustrating a torque structure of a first hinge structure, which provides a torque, according to various embodiments.

FIG. 5A is a diagram illustrating a coupling state of a torque generating structure of a first hinge structure, which provides a torque, according to various embodiments. FIG. 5B is an exploded perspective view illustrating a torque generating structure of a first hinge structure, which provides a torque, according to various embodiments.

Referring to FIGS. 5A and 5B, the torque generating structure 300 for providing a torque may include a first gear fixing member 371, a first rotary shaft 331, a second rotary shaft 332, a first idle gear 321, a second idle gear 322, a second gear fixing member 361, a first cam 351a, a second cam 351b, a fixed cam 341, a first elastic member 342a, a second elastic member 342b, a center bracket 343, and E-rings 391A and 391B. The configurations of the torque generating structure 300 may be formed of a metallic material. The torque generating structure 300 may be formed of the same material or may be formed of the same material, except for the elastic members 342a and 342b. Furthermore, the configurations of the torque generating structure 300 may be formed of different materials.

The first gear fixing member 371 may include four holes (e.g., a first main gear hole 371a, a second main gear hole 371, a first idle gear hole 371c, and a second idle gear hole 371d), into which protrusions extending to sides (e.g., the −x axis direction) of the interworking gears (e.g., the first main gear 331_2, the second main gear 32_2, the first idle gear 321, and the second idle gear 322). The first main gear hole 371a and the second main gear hole 371b may be disposed to be biased to the +z axis direction as compared with the first idle gear hole 371c and the second idle gear hole 371d. An extension part of the first main gear 331_2, which extends to a −x axis edge of the first rotary shaft 331, may be inserted into the first main gear hole 371a. An extension part of the second main gear 332_2, which extends to a −x axis edge of the second rotary shaft 332, may be inserted into the second main gear hole 371b. An extension part of the first idle gear 321, which extends in the −x axis direction, may be inserted into the first idle gear hole 371c, and an extension part of the second idle gear 322, which extends in the −x axis direction, may be inserted into the second idle gear hole 371d. The first gear fixing member 371 may function to fix the interworking gears (the first main gear 331_2, the second main gear 332_2, the first idle gear 321, and the second idle gear 322) while extensions of sides of the interworking gears (the first main gear 331_2, the second main gear 332_2, the first idle gear 321, and the second idle gear 322) are inserted into the four holes.

The first rotary shaft 331 may have a cylindrical shape having a specific length in the x axis direction. The first rotary shaft 331 may include a first shaft body 331_1, a first main gear 331_2 disposed at a-x axis edge of the first shaft body 331_1, and a first ring groove 331_3 formed at an x axis edge of the first shaft body 331_1, and into which a first E-ring 391a may be inserted. The first shaft body 331_1 may include a flat area that is flat, and a curved area that is curved while being continuous to the flat area. Accordingly, at least a portion of a z axis cross-section of the first shaft body 321_1 may have a D shape. The first main gear 331_2 may be geared with the first internal gear 211_5 provided in the first rotation part 211. Accordingly, while the first internal gear 211_5 may be rotated as the first rotation part 211 is rotated, the first main gear 331_2 may be rotated. The first rotary shaft 331 may be rotated about the third axis 13 in a clockwise direction or counterclockwise direction. The first main gear hole 371a provided in the first gear fixing member 371, a first rotary shaft insertion hole 361a provided in the second gear fixing member 361, a first cam 351a, a first cam structure 341_1a of the fixed cam 341, the first elastic member 342a, a first wing part 343a of the center bracket 343 may be inserted into the first rotary shaft 331.

The second rotary shaft 332 may have a shape that is the same as or similar to that of the first rotary shaft 331, and may be disposed to be spaced apart from the first rotary shaft 331 by a specific interval. For example, the second rotary shaft 332 may have a cylindrical shape having a specific length in the x axis direction. The second rotary shaft 332 may be rotated in a direction that is different from a rotational direction of the first rotary shaft 331. For example, the second rotary shaft 332 may be rotated about the fourth axis 14 in a counterclockwise direction (e.g., while the first rotary shaft 331 is rotated in the clockwise direction) or in a clockwise direction (e.g., while the first rotary shaft 331 is rotated in the counterclockwise direction). The second rotary shaft 332 may include a second shaft body 331_1, a second main gear 332_2 disposed at a-x axis edge of the second shaft body 331_1, and a second ring groove 332_3 formed at an x axis edge of the second shaft body 332_1, and into which a second E-ring 391b may be inserted. The second shaft body 332_1 may include a flat area that is flat, and a curved area that is curved while being continuous to the flat area. Accordingly, at least a portion of a z axis cross-section of the second shaft body 332_1 may have a D shape. The second main gear 332_2 may be geared with the second internal gear 212_5 provided in the second rotation part 212. Accordingly, while the second internal gear 212_5 may be rotated as the second rotation part 212 is rotated, the second main gear 332_2 may be rotated. The second main gear hole 371b provided in the first gear fixing member 371, a second rotary shaft insertion hole 361b provided in the second gear fixing member 361, a second cam 351b, a second cam structure 3411b of the fixed cam 341, the second elastic member 342b, a second wing part 343b of the center bracket 343 may be inserted into the second rotary shaft 332.

The first idle gear 321 may be disposed between the first main gear 331_2 and the second idle gear 322. The first idle gear 321 may be rotated as the first main gear 331_2 is rotated, and may deliver a rotational force to the second idle gear 322. The second idle gear 322 may be disposed between the second main gear 332_2 and the first idle gear 321. The second idle gear 321 may be rotated as the second main gear 332_2 is rotated, and may deliver a rotational force to the first idle gear 321. As described above, when the first rotation part 211 or the second rotation part 212 is rotated, the rotational force may be delivered to the first main gear 331_2 or the second main gear 3322_2 via the first internal gear 211_5 or the second internal gear 212_5, and pressures applied to the rotation parts 211 and 212 may be associated with each other through the first idle gear 321 and the second idle gear 332.

The second gear fixing member 361 may include the first rotary shaft insertion hole 361a, into which one side (e.g., an x axis edge of the first shaft body 331_1) of the first rotary shaft 331 is inserted, the second rotary shaft insertion hole 361b, into which one side (e.g., an x axis edge of the second shaft body 332_1) of the second rotary shaft 332 is inserted, a third idle gear hole 361c, into which an extension part of the first idle gear 321, on an opposite side in the x axis direction, is inserted, and a fourth idle gear hole 361d, into which an extension part of the second idle gear 322, on an opposite side in the x axis direction, is inserted. A z axis cross-section of the first rotary shaft insertion hole 361a and the second rotary shaft insertion hole 361b may be circular or at least a portion thereof may have a shape corresponding to z axis cross-sections of the rotary shafts 331 and 332.

The first cam 351a may have at least one mountain and at least one valley in the x axis direction. An x axis central portion of the first cam 351a may have a first cam hole 351_2a that extends in the x axis direction. At least a portion of the first rotary shaft 331 may be seated in and fixed to the first cam hole 351_2a. An x axis cross-section of the first cam hole 351_2a may have a shape that is the same as or similar to a z axis cross-section of the first rotary shaft 331. Accordingly, while the first rotary shaft 331 is rotated in the clockwise direction or the counterclockwise direction, the first cam 351a may be rotated in the clockwise direction or the counterclockwise direction in correspondence to rotation of the first rotary shaft 331.

The second cam 351b may have a shape that is similar to or the same as that of the first cam 351a. For example, at least one mountain and at least one valley may be formed in the x axis direction. An x axis central portion of the second cam 351b may have a second cam hole 351_2b that extends in the x axis direction. At least a portion of the second rotary shaft 332 may be seated in and fixed to the second cam hole 351_2b. An x axis cross-section of the second cam hole 351_2b may have a shape that is the same as or similar to a z axis cross-section of the second rotary shaft 332. Accordingly, while the second rotary shaft 332 is rotated in the clockwise direction or the counterclockwise direction, the second cam 351b may be rotated in the clockwise direction or the counterclockwise direction in correspondence to rotation of the second rotary shaft 332.

The fixed cam 341 may include a first cam structure 341_2a disposed to be engaged with the first cam 351a, a second cam structure 341_1b disposed to be engaged with the second cam 351b, and a cam connector 341_1 connecting the first cam structure 341_1a and the second cam structure 341_1b. The first cam structure 341_1a may include at least one mountain and at least one valley formed in the −x axis direction to be engaged with the first cam 351a. The first cam structure 341_1a may include a first cam structure hole 341_2a that is formed at a central portion thereof and extends in the x axis direction. The first cam structure hole 341_2a may have a circular cross-section differently from a z axis cross-section shape of the first rotary shaft 331. Accordingly, the first rotary shaft 331 may be rotated in the first cam structure hole 341_2a. The second cam structure 341_1b may be disposed to be symmetrical to the first cam structure 341_1a with respect to the x axis. The second cam structure 341_1a may include at least one mountain and at least one valley formed in the −x axis direction to be engaged with the second cam 351b. The second cam structure 341_1b may include a second cam structure hole 341_2b that is formed at a central portion thereof and extends in the x axis direction. The second cam structure hole 341_2b may have a shape that is the same as or similar to that of the first cam structure hole 341_2a. For example, the second cam structure hole 341_2b may have a circular cross-section. Accordingly, the second rotary shaft 332 may be rotated in the second cam structure hole 341_2b. The above-described fixed cam 341 may be linearly moved (e.g., linearly moved in the x axis or −x axis direction) in correspondence to the first rotary shaft 331 and the second rotary shaft 332. According to the linear movement of the fixed cam 341, compression distances of the first elastic member 342a and the second elastic member 342b may become different.

The first elastic member 342a may have a cylindrical spring shape having a hollow central portion such that the first rotary shaft 331 passes therethrough. According to various embodiments, the first elastic member 342a may include at least one leaf spring, a central portion of which is opened and which is convex in the x axis direction. The first elastic member 342a may be disposed between the fixed cam 341 and the center bracket 343. While the center bracket 343 supports the first elastic member 342a and the fixed cam 341 is linearly moved in the x axis direction, the compression state of the first elastic member 342a may become different. The first elastic member 342a may provide a torque change (or a frictional force change) to the first cam structure 341_1a and the first cam 351a according to a change of the compression state.

The second elastic member 342b, similarly to the first elastic member 342a, may provide a torque change or a frictional force change to the second cam structure 341_1b and the second cam 351b. In this regard, the second elastic member 342b may be various forms, such as a spring type or a leaf spring type. The second elastic member 342b may be inserted into the second rotary shaft 332, and while the first elastic member 342a is compressed by a rear surface of the first cam structure 341_1a of the fixed cam 341 and the center bracket 343, may be compressed by a rear surface of the second cam structure 341_1b of the fixed cam 341 and the center bracket 343.

The center bracket 343 may include a center body 343_1, a first wing part 343a disposed in the y axis direction of the center body 343_1, and a second wing part 343b disposed in the −y axis direction of the center body 343_1. A hole that extends in the z axis direction may be disposed at a central portion of the center body 343_1. A coupling member (e.g., a screw) may be inserted into a central portion hole 343_1a of the center body 343_1, and the coupling member may be inserted into a boss provided in the hinge housing 150 to fix the center bracket 343. The first wing part 343a may include a first center hole 343a_1 that is connected to the center body 343_1 and extends in the x axis direction. One side of the first rotary shaft 331 may be inserted into the first center hole 343a_1. The second wing part 343b may include a second center hole 343b_1 that is connected to the center body 343_1 and extends in the x axis direction. One side of the second rotary shaft 332 may be inserted into the second center hole 343b_1

The E-rings 391A and 391B may include a first E-ring 391a inserted into an end of the first rotary shaft 331 in the x axis direction while facing one surface of the first wing part 343a in the x axis direction, and a second E-ring 391b inserted into an end of the second rotary shaft 332 in the x axis direction while facing one surface of the second wing part 343b in the x axis direction. The E-rings 391A and 391B may function to fix the first rotary shaft 331 and the second rotary shaft 322 such that the first rotary shaft 331 and the second rotary shaft 332 are not extracted in the −x axis direction. According to various embodiments, the E-rings 391A and 391B may provide a frictional force of a specific magnitude while being inserted into the first rotary shaft 331 and the second rotary shaft 332 and contacting a surface of the center bracket 343 in the x axis direction (e.g., contacting surfaces of the first wing part 343a and the second wing part 343b in the x axis direction). The frictional force may be used to support a free-stop function of temporarily fixing the first housing 110 and the second housing 120 while there is no additional external pressure at a specific angle when the first rotary shaft 331 and the second rotary shaft 332 are rotated.

Figure 6A:
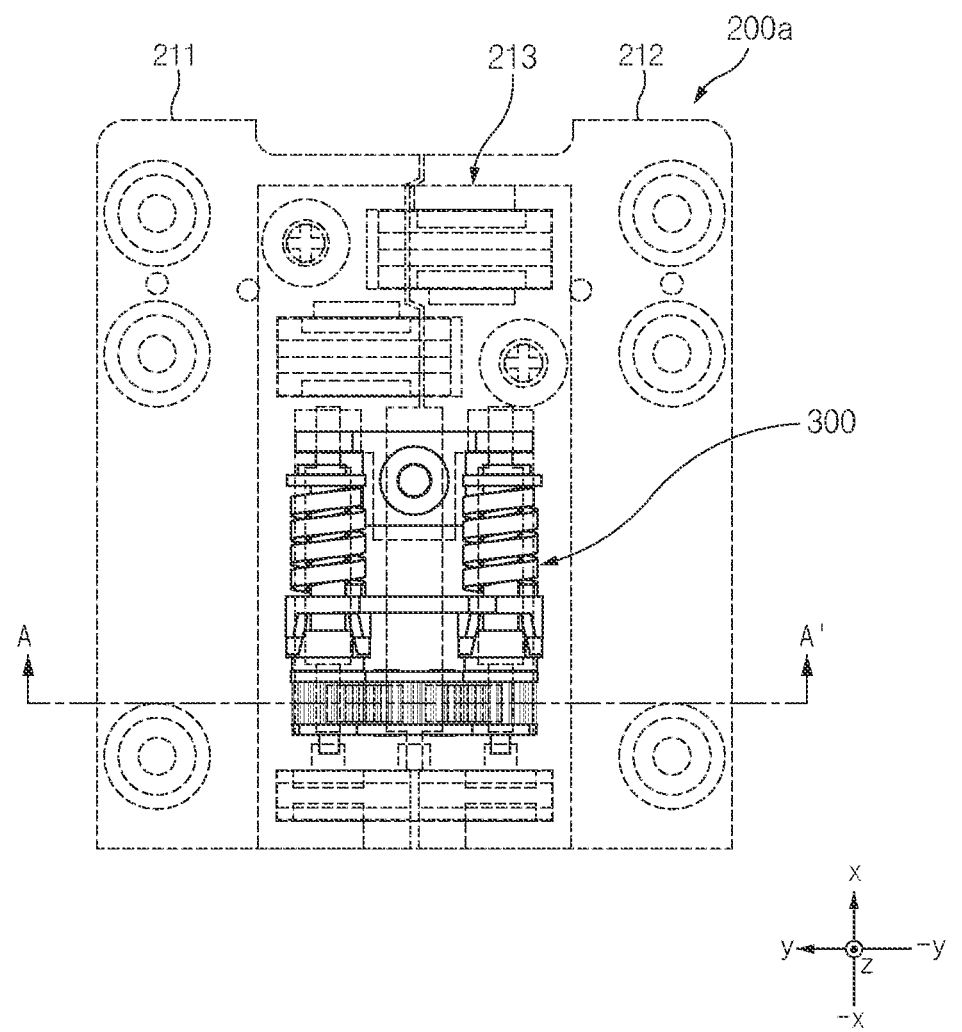
FIG. 6A is a diagram illustrating an example of at least a partial configuration of a gear connection state of a first hinge structure, in a cross-section, according to various embodiments.
Figure 6A:
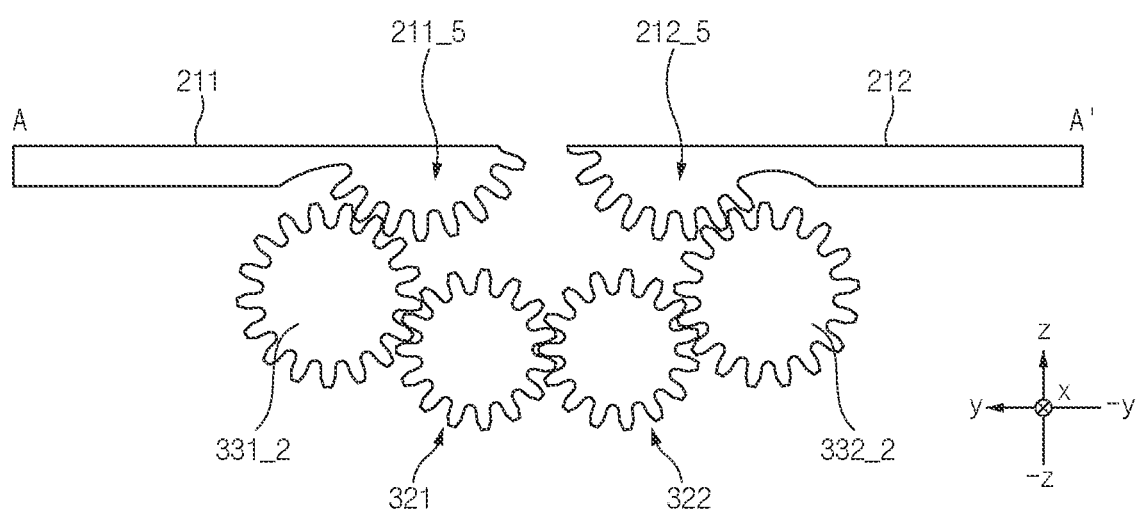
Figure 6B:
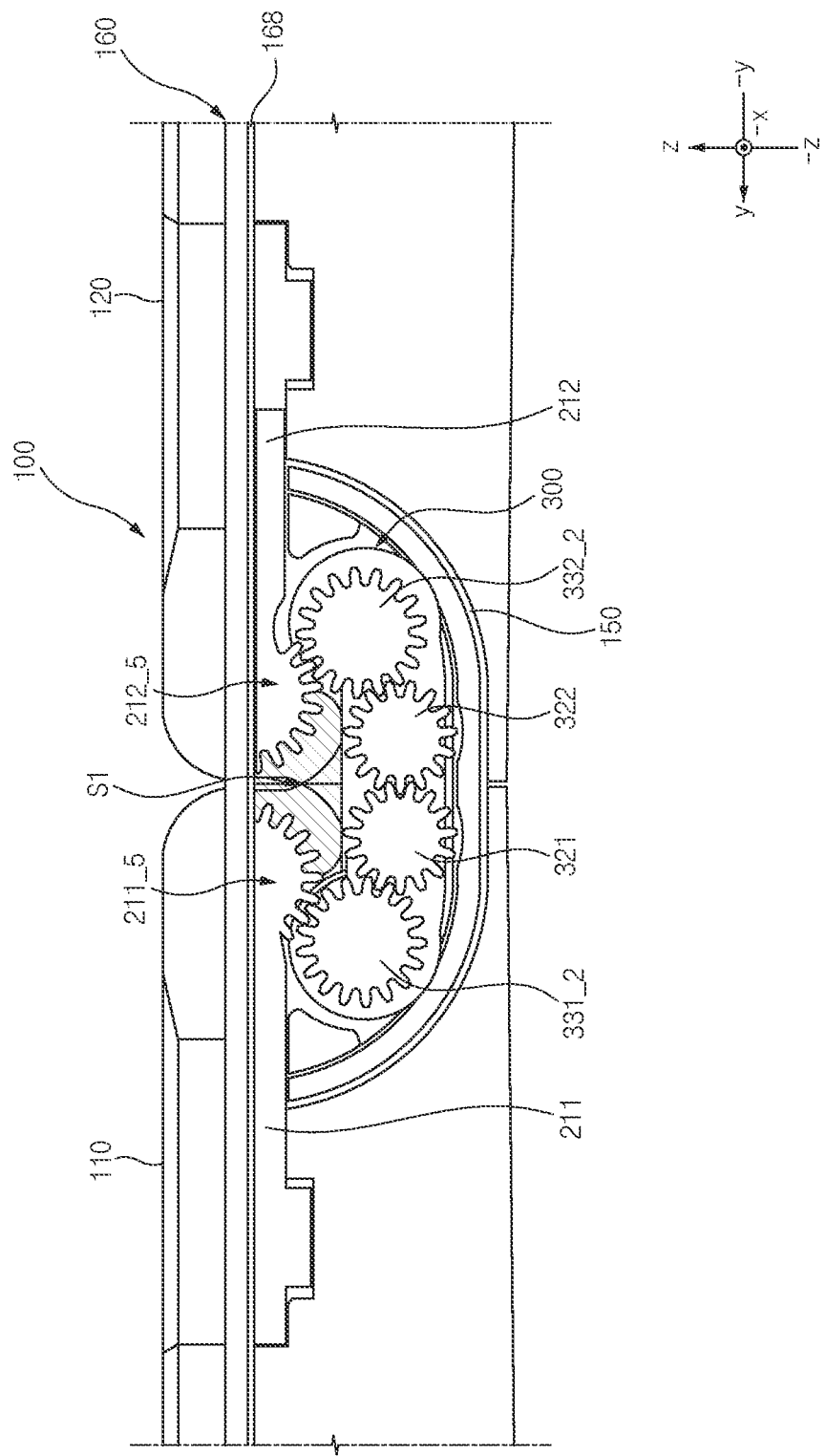
FIG. 6B is a cross-sectional view illustrating an example of one side of an electronic device according to various embodiments.

FIG. 6A is a diagram illustrating an example of at least a partial configuration of a gear connection state of a first hinge structure, in one cross-section, according to various embodiments. FIG. 6B is a view illustrating an example of a cross-section of one side of an electronic device according to various embodiments. In FIG. 6A, cutting line A-A' is a line that cuts a location of the first hinge structure 200a, at which the interworking gears are disposed, and a location, at which the first rotation part 211 and the second rotation part 212 are disposed, and a cross-sectional view illustrated in FIG. 6A is a view illustrating some configurations of the first hinge structure 200a including only some configurations of the first rotation part 211, some configurations of the second rotation part 212, and the interworking gears (e.g., the first main gear 331_2, the second main gear 332_2, the first idle gear 321, and the second idle gear 322). FIG. 6B, for example, is a view illustrating an example of a cross-section, taken along a transverse cutting line with reference to the drawings of the foldable electronic device 100 illustrated in FIG. 1A.

Referring to FIGS. 6A and 6B, the foldable electronic device 100 according to the embodiment may include the first housing 110, the second housing 120, the hinge housing 150, the display 160, and the first hinge structure 200a (or the second hinge structure 200b). The display 160 may be disposed on at least a portion of the first housing 110 and the second housing 120. According to various embodiments, edges of the first housing 110 and the second housing 120 may be disposed to protrude further than an adjacent area thereof to surround an edge of the display 160. The first hinge structure 200a may be disposed under the display 160. A support plate 168 that supports the display 160 may be disposed between the display 160 and the first hinge structure 200a (or between the display 160a and the housings (e.g., the first housing 110, the second housing 120, and the hinge housing 150)). At least a portion of the support plate 168, which is located on the first hinge structure 200a, may have a wrinkle structure or a lattice structure. A rear panel including at least one layer disposed on the rear surface of the display 160 may be disposed between the display 160 and the support plate 168. The rear panel, for example, may include an embossing layer or a copper layer.

The first hinge structure 200a may include at least the first rotation part 211 and the second rotation part 212, the first rotation part 211, as described above, may include the first internal gear 211_5, and the second rotation part 212 may include the second internal gear 212_5. The gear connection structure of the first hinge structure 200a, which is coupled to the interworking gears, may include at least the first rotation part 211, in which the first internal gear 211_5 is disposed, the second rotation part 212, in which the second internal gear 212_5 is disposed, the first main gear 331_2, the second main gear 332_2, the first idle gear 321, and the second idle gear 322. One side of the first main gear 331_2 may be geared with the first internal gear 211_5, and an opposite side thereof may be geared with the first idle gear 321. One side of the second main gear 332_2 may be geared with the second internal gear 212_5, and an opposite side thereof may be geared with the second idle gear 322. According to various embodiments, the first internal gear 211_5 may be positioned on an upper side (e.g., the z axis direction or a direction, in which the display is disposed) of a transverse central line (the x axis or the −x axis that passes through the central line of the first main gear) of the first main gear 331_2, and the second internal gear 212_5 may be positioned on an upper side (e.g., the z axis direction or a direction, in which the display is disposed) of a transverse central line (the x axis or the −x axis that passes through the central line of the second main gear) of the second main gear 332_2. According to various embodiments, as described in FIG. 4 above, the first internal gear 211_5 may be positioned on a lower side (e.g., the −z axis direction or the direction of the hinge housing) of a transverse central line (e.g., the x axis or the −x axis that passes through the central line of the first main gear) of the first main gear 331_2, and the second internal gear 212_5 may be positioned on a lower side (e.g., the z axis direction or the direction of the hinge housing) of a transverse central line (e.g., the x axis or the −x axis that passes through the central line of the second main gear) of the second main gear 332_2.

A gear ratio of the first internal gear 211_5 and the first main gear 331_2 may be larger than a gear ratio of the first main gear 331_2 and the first idle gear 321. For example, when the number of the teeth of the first internal gear 211_5 is 20, the number of the teeth of the first main gear 331_2 may be 17 and the number of the teeth of the first idle gear 321 may be 15. The gear ratios of the first internal gear 211_5 and the first main gear 331_2, and the second internal gear 212_5 and the second main gear 332_2 may be the same, and the gear ratios of the first main gear 331_2 and the first idle gear 321, and the second main gear 332_2 and the second idle gear 322 may be the same. Through the above-described gear ratios, the interworking force may increase even though a low force is applied to the rotation parts 211 and 212. Accordingly, the foldable electronic device 100 may reduce a magnitude of a force that is to be applied by a user, while the folded state of the first housing 110 connected to the first rotation part 211 and the second housing 120 connected to the second rotation part 212 is changed to an unfolded state. Furthermore, according to the foldable electronic device 100 according to the embodiment, an environment, by which the sizes of the gears may be increased by a necessary degree, may be provided by securing a space S1 for disposing the rotation parts 211 and 212 and the arm part and disposing the internal gears 211_5 and 212_5 and the interworking gears 331_2, 332_2, and 321, and 322 in the secured space S1. Furthermore, when the above-described space S1 is minimized and/or reduced, the foldable electronic device according to the embodiment may provide an environment that may implement a very small thickness.

As described above, various embodiments of the disclosure provides an environment that may form the sizes of the idle gears 3211 and 322 to a size desired by the designer by directly connecting the interworking gears 331_2, 332_2, 321, and 322 and the rotation parts 211 and 212 to eliminate restrictions on the size of a structure (e.g., the fixed cam 341 and the cams 351a and 351b) related to a cam operation. Accordingly, various embodiments may prevent and/or reduce damage to the display by sufficiently securing a drop gap (a gap for preventing and/or reducing collision due a drop). Furthermore, various embodiments may provide an environment, in which an opening torque (when opened or unfolded) generated in a process of changing the folded state of the foldable electronic device 100 to the unfolded state and a closing torque (when closed or folded) generated in a process of changing the unfolded state to the folded state may be made uniform, and a force that is a torque generated by the torque generating structure 300 or more may be delivered through the interworking gears using a gear ratio (a gear ratio of the internal gear and the main gears).

Figure 7A:
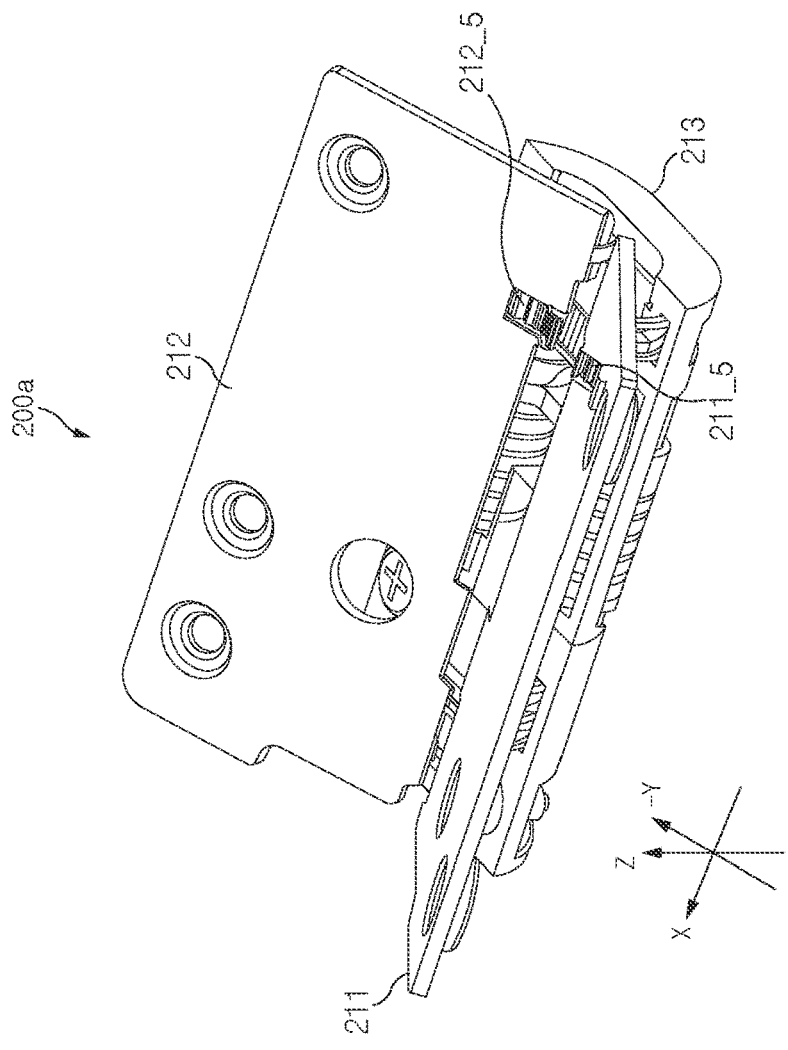
FIG. 7A is a diagram illustrating an example of a first hinge structure in a first angle state according to various embodiments.
Figure 7A:
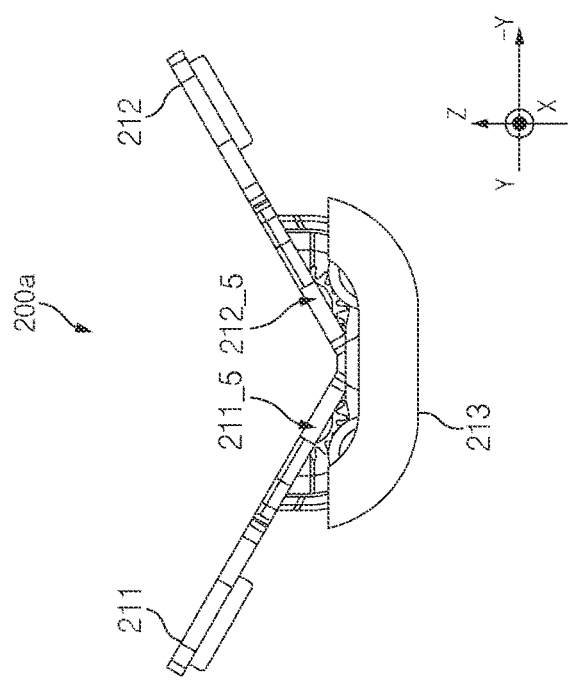
Figure 7B:
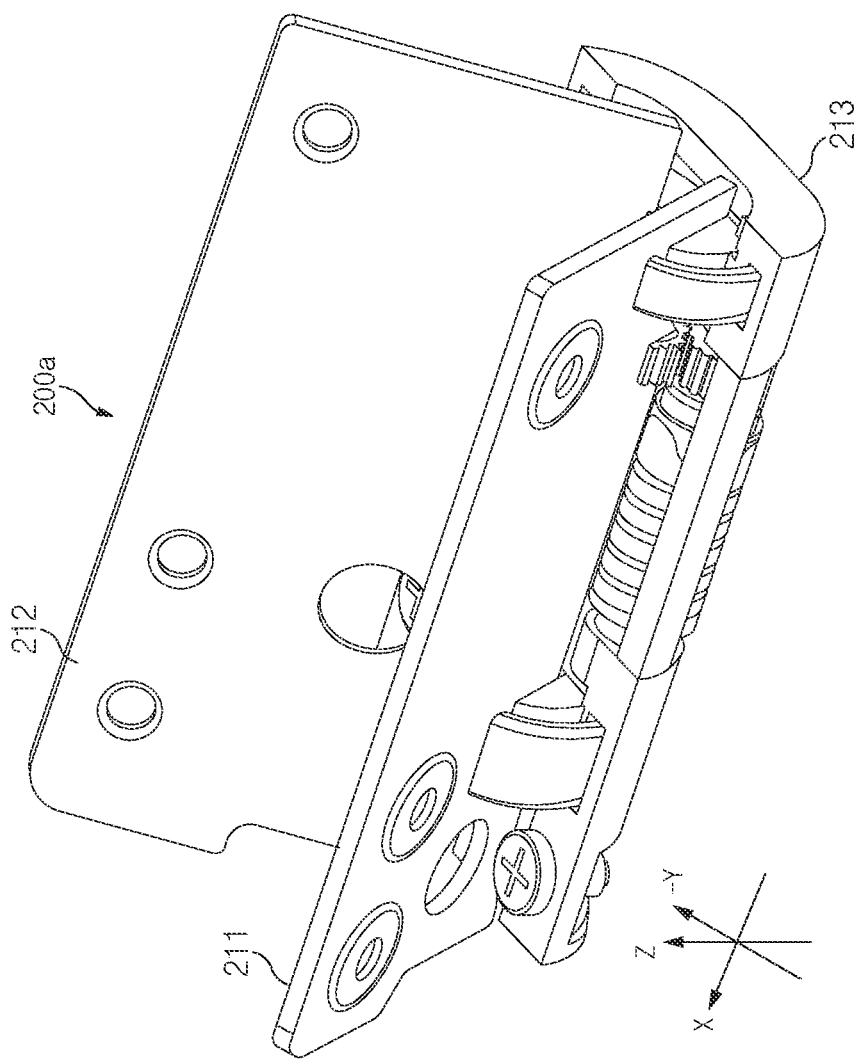
FIG. 7B is a diagram illustrating an example of a first hinge structure in a second angle state according to various embodiments.
Figure 7B:
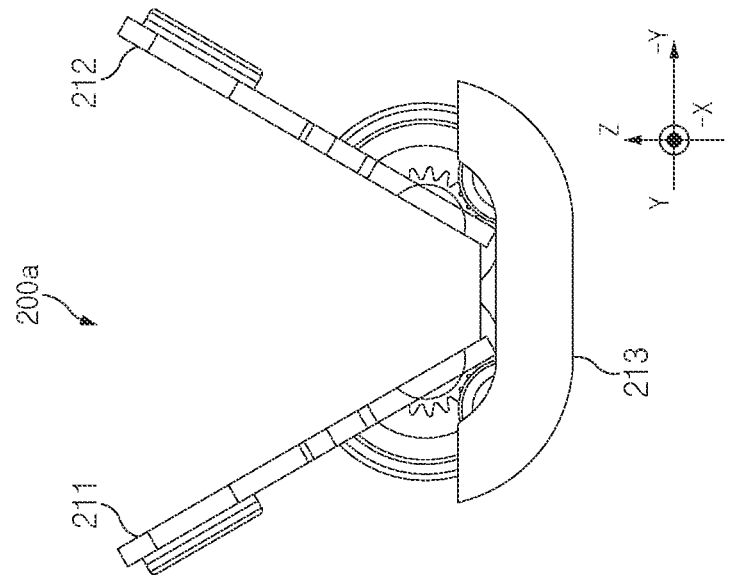
Figure 7C:
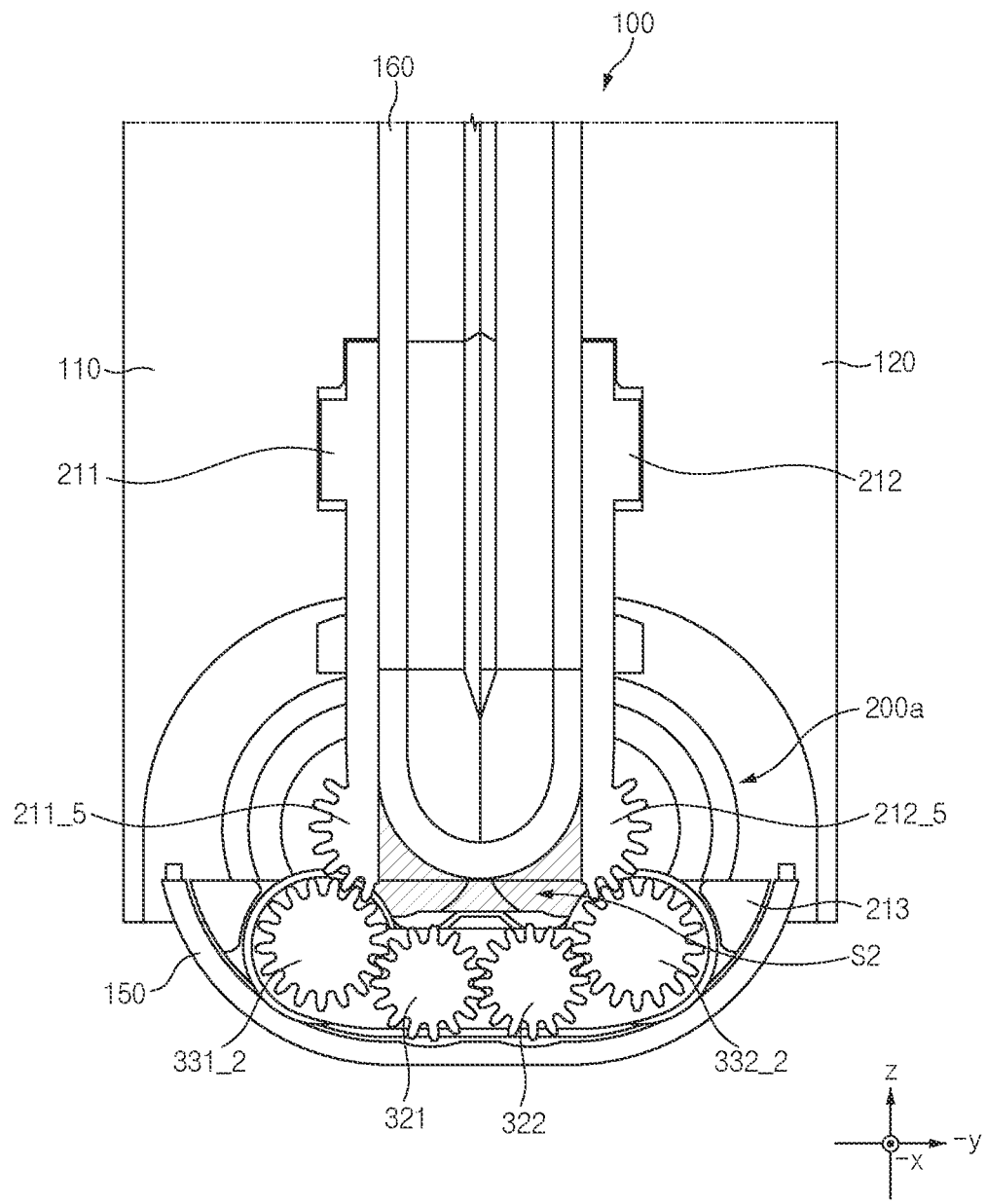
FIG. 7C is a diagram illustrating an example of a first hinge structure in a fully folded state according to various embodiments.

FIG. 7A is a diagram illustrating an example of a first hinge structure in a first angle state according to various embodiments. FIG. 7B is a diagram illustrating an example of a first hinge structure in a second angle state according to various embodiments. FIG. 7C is a diagram illustrating an example of a first hinge structure in a fully folded state according to various embodiments.

Referring to FIGS. 1A to 7A, the first rotation part 211 of the first hinge structure 200a may be rotated in the clockwise direction by a first angle (e.g., about 30 degrees) with reference to the fully unfolded state (e.g., a state, in which a contained angle between the first rotation part 211 and the second rotation part 212 is 180 degrees or close to 180 degrees, or a state, in which the first rotation part 211 is not rotated in the counterclockwise direction and the second rotation part 212 is not rotated in the clockwise direction). In correspondence, the second rotation part 212 of the first hinge structure 200a may be rotated in the counterclockwise direction by a first angle with reference to the fully unfolded state. According to rotation of the first rotation part 211 and the second rotation part 212, the first internal gear 211_5 and the second internal gear 212_5 may be rotated in the counterclockwise direction and the clockwise direction by the first angle, respectively. Accordingly, the first main gear 331_2 geared with the first internal gear 211_5, the second main gear 332_2 geared with the second internal gear 212_5, and the idle gears 321 and 322 may be rotated.

Referring to FIGS. 1A to 7B, the first rotation part 211 of the first hinge structure 200a may be rotated in the clockwise direction by a second angle (e.g., about 60 degrees) with reference to the fully unfolded state. In correspondence, the second rotation part 212 of the first hinge structure 200a may be rotated in the counterclockwise direction by the second angle with reference to the fully unfolded state. According to rotation of the first rotation part 211 and the second rotation part 212, the first internal gear 211_5 and the second internal gear 212_5 may be rotated in the counterclockwise direction and the clockwise direction by the second angle, respectively.

Referring to FIGS. 1A and 7C, the foldable electronic device 100 may include the first housing 110, the second housing 120, the hinge housing 150, the display 160, and the first hinge structure 200a. Because the first housing 110 and the second housing 120 are disposed in parallel in the z axis direction, the display 160 may be disposed in the folded state. In correspondence, the first rotation part 211 and the second rotation part 212 of the first hinge structure 200*a* may be disposed parallel toward the z axis direction. Because the first housing 110 and the second housing 120 are disposed in parallel in the z axis direction, at least a portion of the hinge housing 150 may be exposed to the outside.

The first hinge structure 200*a* may include at least the first rotation part 211 and the second rotation part 212 coupled to the fixing bracket 213, the first rotary shaft 3312, in which the first main gear 331_2 is formed, the second rotary shaft 332, in which the second main gear 332_2, and the idle gears 321 and 322. An end (e.g., an edge in the −Z axis direction) of one side of the first internal gear 211_5 of the first hinge structure 200*a* may be disposed in a gear connection state with the first main gear 331_2, and an end (e.g., an edge in the −z axis direction) of one side of the second internal gear 212_5 may be disposed in a gear connection state with the second main gear 332_2. Because the first internal gear 211_5 and the second internal gear 212_5 are disposed to be parallel in the z axis direction, an empty space S2 may be formed between the display 160 and the idle gears 321 and 322. The empty space S2 is formed such that an interval between the display 160 and the idle gears 321 and 322 is a specific value or more, whereby collisions between the display 160 and the idle gears 321 and 322 may be prevented and/or reduced even though an impact is applied to the foldable electronic device 100 due to a drop or the like.

Figure 8A:
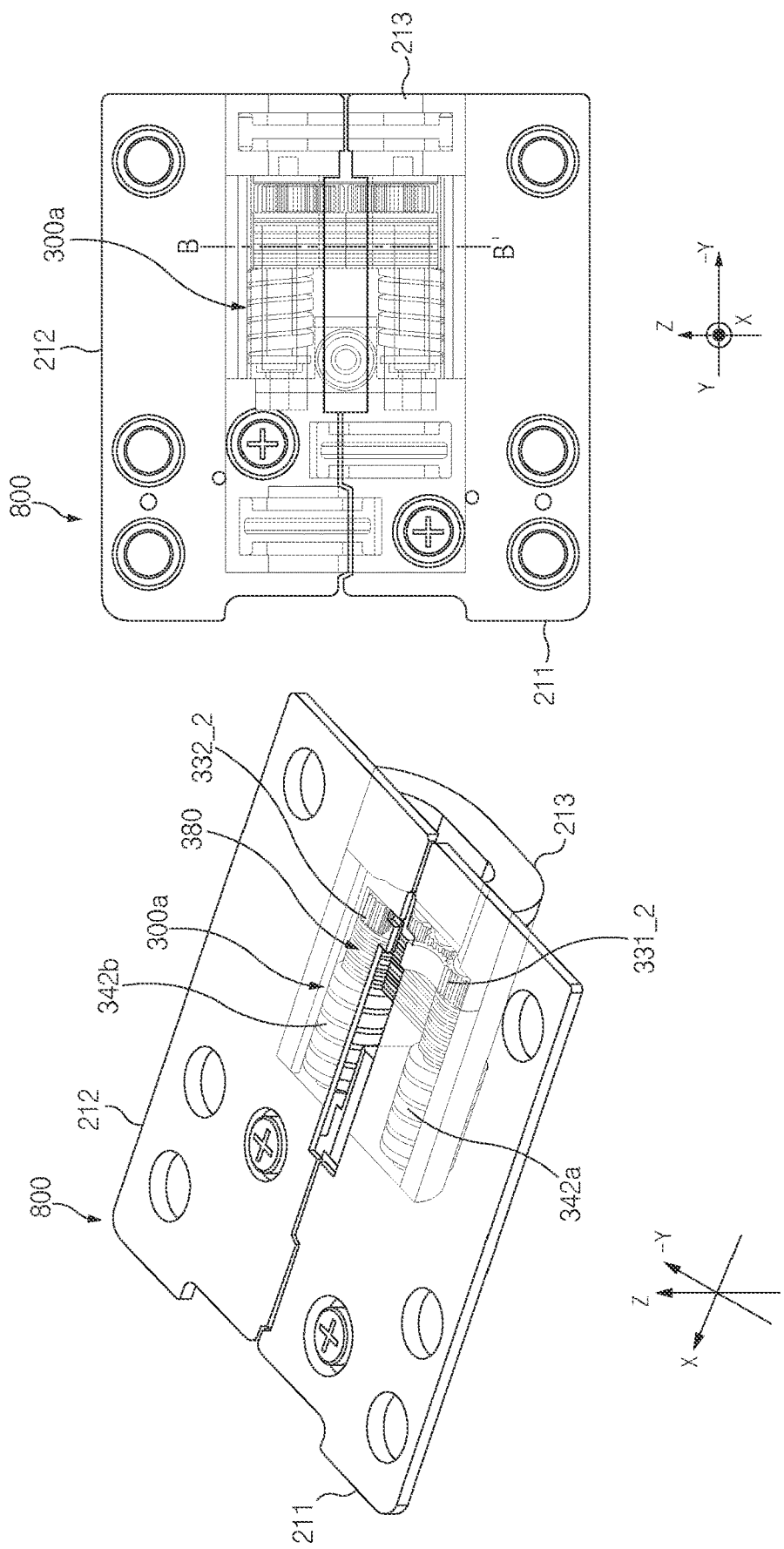
FIG. 8A is a diagram illustrating an example of a first hinge structure according to various embodiments.
Figure 8B:
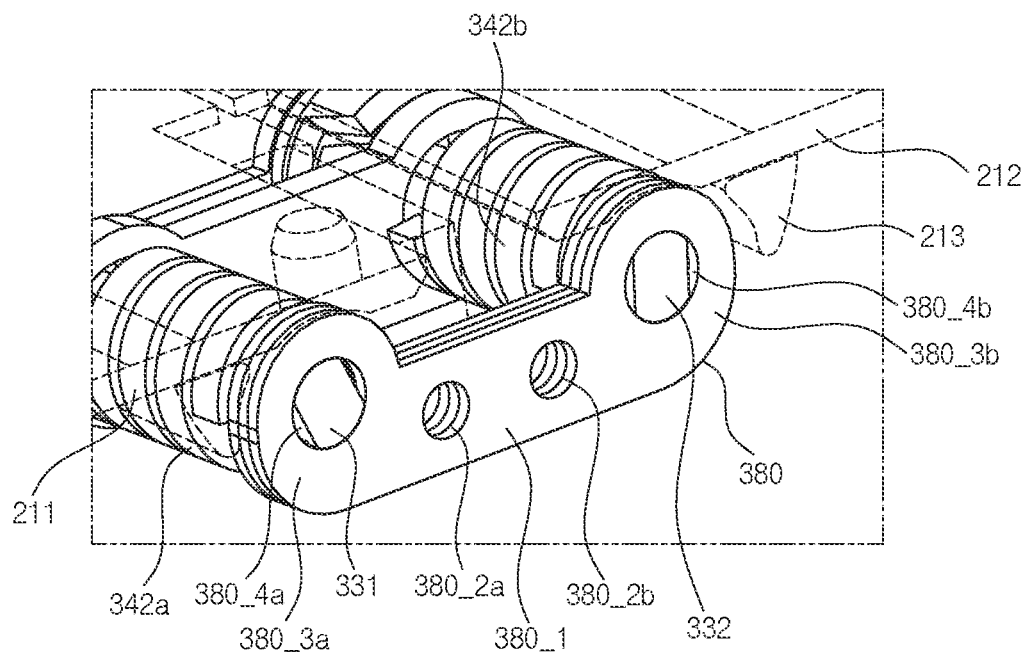
FIG. 8B is a perspective cross-sectional view taken along cutting line B-B' of FIG. 8A according to various embodiments.
Figure 8C:
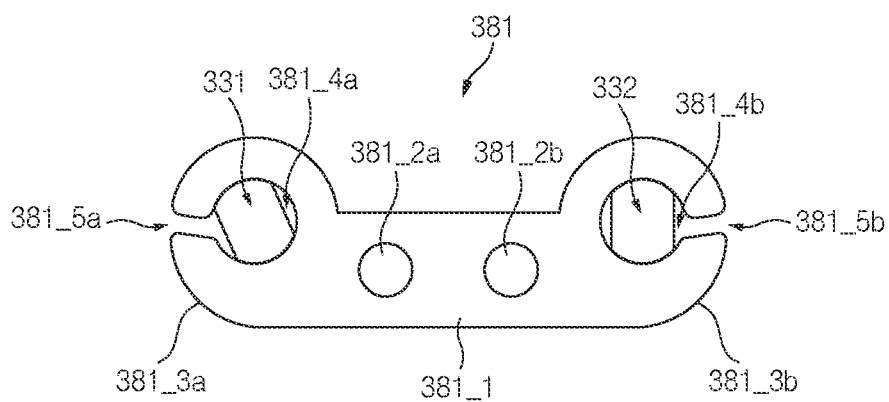
FIG. 8C is a diagram illustrating an example of a shape of a structure related to generation of a torque according to various embodiments.

FIG. 8A is a diagram illustrating an example of a first hinge structure according to various embodiments. FIG. 8B is a sectional perspective view taken along cutting line B-B' of FIG. 8A. FIG. 8C is a diagram illustrating an example of a shape of a structure related to generation of a torque according to various embodiments.

Referring to FIGS. 1A to 8A and 8B, a first hinge structure 800 according to another embodiment may include the first rotation part 211, the second rotation part 212, the fixing bracket 213, and the torque generating structure 300*a*. The first rotation part 211, the second rotation part 212, and the fixing bracket 213 may have the same structures as those of the rotation parts and the fixing bracket of the hinge structure described above in FIG. 3.

The torque generating structure 300*a*, for example, may include at least the first rotary shaft 331, into which the first elastic member 342*a* is inserted, the second rotary shaft 332, into which the second elastic member 342*b* is inserted, and a surface pressure structure 380 inserted into the first rotary shaft 331 and the second rotary shaft 332. The torque generating structure 380, additionally, as described in FIG. 5B, may further include a structure related to a cam operation, gears, and a center bracket.

According to an embodiment, the surface pressure structure 380 may include a surface pressure body 380_1, a first wing 380_3*a*, into which the first rotary shaft 331 is inserted, and a second wing 380_3*b*, into which the second rotary shaft 332 is inserted. The surface pressure body 381_1 may include at least one hole 380_2*a* and 380_2*b*. The at least one hole 380_2*a* and 380_2*b* may contribute to enhancement of the elasticity of the surface pressure body 381_1. The first wing 380_3*a* may include a first wing hole 380_4*a*, into which the first rotary shaft 331 is inserted. An inner wall of the first wing hole 380_4*a* may contact an outside of the first rotary shaft 331. A frictional force due to contact of the inner wall of the first wing hole 380_4*a* and the outside of the first rotary shaft 331 may contribute to enhancement of the torque of the first hinge structure 200*a*. Similarly, the second wing 380_3*b* may include a second wing hole 380_4*b*, into which the second rotary shaft 332 is inserted. An inner wall of the second wing hole 380_4*b* may contact an outside of the second rotary shaft 332. A frictional force due to contact of the inner wall of the second wing hole 380_4*b* and the outside of the second rotary shaft 332 may contribute to enhancement of the torque of the first hinge structure 200*a*. The above-described surface pressure structure 380 may be implemented by a plurality of layers to increase elasticity. According to various embodiments, the surface pressure structure 380 may be integrally formed as a single body. A diameter of the first wing hole 380_4*a* and a diameter of the second wing hole 380_4*b* may be the same as a thickness (or a size of a circle, a radius of which is a distance from a center of the first rotary shaft 331 to an outside) of the first rotary shaft 331 and a thickness (or a size of a circle, a radius of which is a distance from a center of the second rotary shaft 332 to an outside) of the second rotary shaft 332.

Referring to FIG. 8C, the surface pressure structure included in the first hinge structure 200*a*, as illustrated, may include a surface pressure body 381_1, a first deformed wing 381_3*a* having a deformed first wing, a second deformed wing 381_4*a* having a deformed second wing, a first deformed wing hole 381_4*a* formed at a central portion of the first deformed wing 381_3*a* and into which the first rotary shaft 331 is inserted, a second deformed wing hole 381_4*b* formed at a central portion of the second deformed wing 381_3*b* and into which the second rotary shaft 332 is inserted, a first opening 381_5*a* formed on one side of the first deformed wing 381_3*a* and connecting the first deformed wing hole 381_4*a* and the outside, and a second opening 381_5*b* formed on one side of the second deformed wing 381_3*b* and connecting the second deformed wing hole 381_4*b* and the outside. The surface pressure structure 381 may have a size and a structure that are similar to those of the surface pressure structure 380 described above in FIGS. 8A and 8B. Furthermore, according to various embodiments, a size of the first deformed wing hole 381_4*a* and a size of the second deformed wing hole 381_4*b* may be smaller than a size of the first wing hole 380_4*a* and a size of the second wing hole 380_4*b* described in FIG. 8B. Furthermore, a size (or diameter) of the first deformed wing hole 381_4*a* and a size (or diameter) of the second deformed wing hole 381_4*b* may be smaller than sizes (or a diameter of a long axis that crosses the center of the shaft) of the first rotary shaft 331 and the second rotary shaft 332. Accordingly, while the first rotary shaft 331 is inserted into the first deformed wing hole 381_4*a* of the surface pressure structure 381, elasticity may increase while the size of the first opening 381_5*a* becomes larger than an initial state. Similarly, while the second rotary shaft 332 is inserted into the second deformed wing hole 381_4*b*, the elastic force increases while the size of the second opening 381_5*b* becomes larger than the initial size, whereby inner surfaces of the second rotary shaft 332 and the second deformed wing 381_3*b* contact each other with a force that is higher than the initial state. Accordingly, the surface pressure structure 381 may provide a high frictional force (e.g., a frictional force or a torque between an outside of the first rotary shaft 331 and an inner surface of the first deformed wing hole 381_4*a* or an outside of the second rotary shaft 332 and an inner surface of the second deformed wing hole 381_4*b*).

Figure 9:
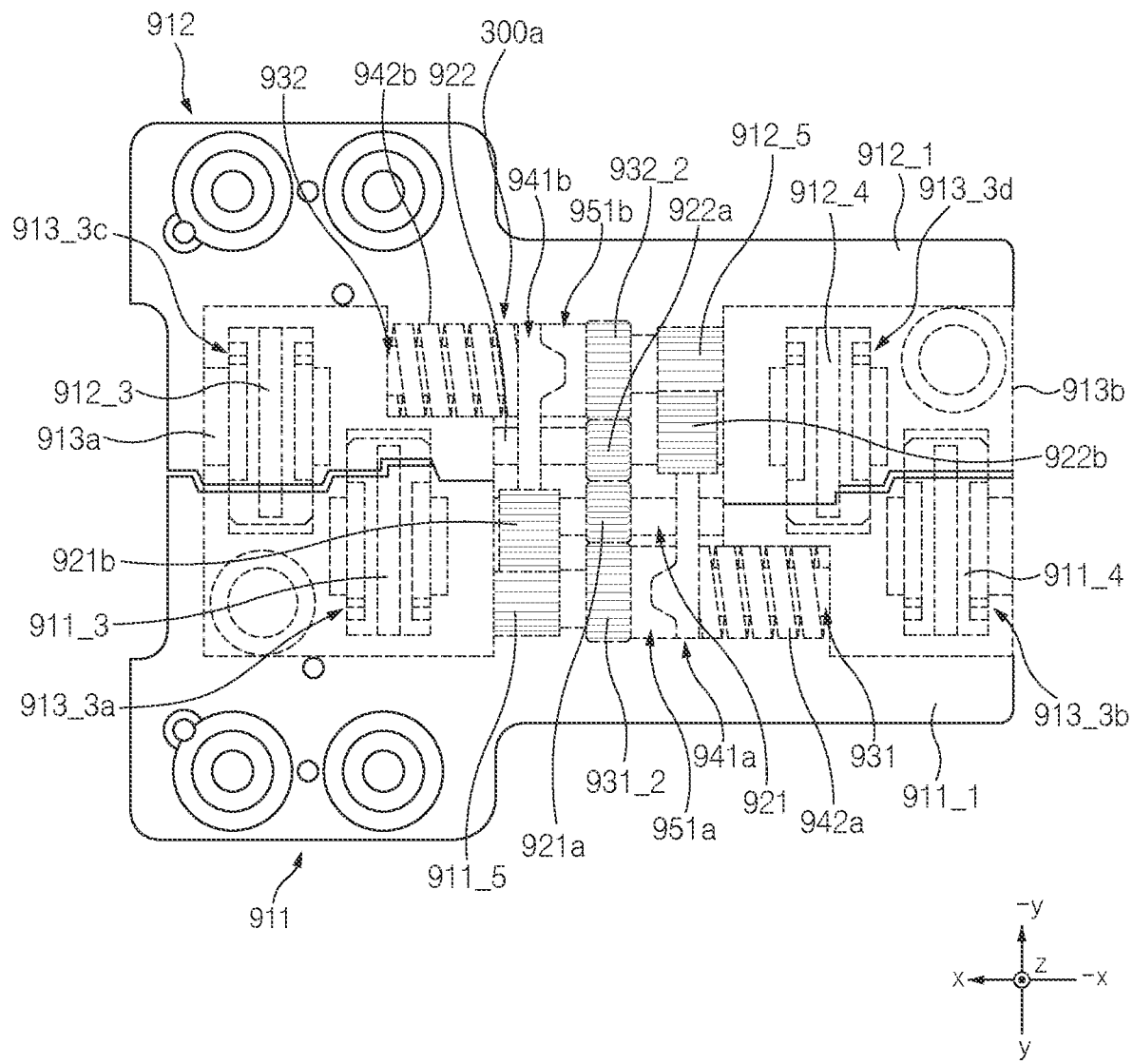
FIG. 9 is a diagram illustrating an example of a hinge structure having two fixing brackets according to various embodiments.

FIG. 9 is a diagram illustrating an example of a hinge structure having two fixing brackets according to various embodiments. Prior to a description, the hinge structure described in FIG. 9 may be applied to at least one of the first hinge structure or the second hinge structure suggested above in FIGS. 1A to 8C.

Referring to FIGS. 2 to 8 and 9, a hinge structure 900 according to an embodiment may include a first rotation part 911, a second rotation part 912, a first fixing bracket 913a, a second fixing bracket 913b, and a torque generating structure 300a.

The first rotation part 911 may include a first rotation body 911_1, a first rail 911_3, a second rail 911_4, and a first internal gear 911_5. The first rail 911_3 may be seated in the first rail hole 913_3a provided in the first fixing bracket 913a, and the second rail 911_4 may be coupled to the second rail hole 913_3b provided in the second fixing bracket 913b. Sizes and structures of the first rail 911_3 and the second rail 911_4 may be the same. The second rotation part 912, similarly to the first rotation part 911, may include a second rotation body 912_1, a third rail 912_3, a fourth rail 912_4, and a second internal gear 912_5. The third rail 912_3 may be seated in the third rail hole 913_3c provided in the first fixing bracket 913a, and the fourth rail 912_4 may be coupled to the fourth rail hole 913_3d provided in the second fixing bracket 913b. Sizes and structures of the third rail 912_3 and the fourth rail 912_4 may be the same. According to various embodiments, the first rail 911_3 and the third rail 912_3 may have the same size and structure. The first rail 911_3 and the second rail 911_4 are rotated about the same operation axis, and an operation axis of the first rail 911_3 and an operation axis of the first rotary shaft 931 may be different. For example, the operation axis of the first rotary shaft 931 may be biased to a y axis edge as compared with the operation axis of the first rail 911_3.

The first fixing bracket 913a may be disposed to be biased to the x axis direction, and the second fixing bracket 913b may be disposed to be biased to the −x direction while being spaced apart from the first fixing bracket 913b by a specific interval. The torque generating structure 300a may be disposed between the first fixing bracket 913a and the second fixing bracket 913b. The first fixing bracket 913a has an L shape, includes a first rail hole 913_3a, into which the first rail 911_3 of the first rotation part 911 is inserted, and a second rail hole 913_3b, into which the third rail 912_3 of the second rotation part 912 is inserted, and may be fixed to the hinge housing 150 through a coupling member such as a screw. The second fixing bracket 913b has an L shape, and may be disposed to be symmetrical to the first fixing bracket 913a with respect to the y axis. The second fixing bracket 913b may include a third rail hole 913_3c, into which the second rail 911_4 of the first rotation part 911 is inserted, and a fourth rail hole 913_3d, into which the fourth rail 912_4 of the second rotation part 912 is inserted, and may be fixed to the hinge housing 150 through a coupling member such as a screw.

The torque generating structure 300a may include the rotary shaft 931, the second rotary shaft 932, the first gear shaft 921, the second gear shaft 922, the interworking gears (e.g., the first main gear 931_2, the first idle gear 921a, the second idle gear 922a and the second main gear 932_2), the second fixed cam 941b, the first cam 951a, the second cam 951b, the first elastic member 942a, and the second elastic member 942b.

The first rotary shaft 931 may be disposed between one side (e.g., a −x axis edge) of the first fixing bracket 913a and one side (e.g., an x axis edge) of the second fixing bracket 913b. The first elastic member 942a, the cam structure of the first fixed cam 941a, and the first cam 951a may be inserted into the first rotary shaft 931, and the first main gear 931_2 may be disposed in an x axis edge. An x axis end of the first rotary shaft 931 may be fixed to a-x axis side surface of the first internal gear 911_5.

The second rotary shaft 932 may be disposed to be further biased to the x axis direction as compared with the first rotary shaft 931. The second rotary shaft 932 may be disposed between an opposite side (e.g., a −x axis edge) of the first fixing bracket 913a and an opposite side (e.g., an x axis edge) of the second fixing bracket 913b. The second elastic member 942b, the cam structure of the second fixed cam 941b, and the second cam 951b may be inserted into the second rotary shaft 932, and the second main gear 932_2 may be disposed in a −x axis edge. A −x axis end of the second rotary shaft 932 may be fixed to an x axis side surface of the second internal gear 912_5.

The first fixed cam 941a may have a hole, into which the first gear shaft 921 is inserted, and a cam structure engaged with the first cam 951a. The second fixed cam 941b, similarly to the first fixed cam 941a, may have a hole, into which the second gear shaft 922 is inserted, and a cam structure engaged with the second cam 951b. The first elastic member 942a may be inserted into the first rotary shaft 931, and may be disposed between an x axis surface of the second fixing bracket 913b and the first fixed cam 941a. The second elastic member 942b may be inserted into the second rotary shaft 932, and may be disposed between a −x axis surface of the first fixing bracket 913a and the second fixed cam 941b.

A portion of the first fixed cam 941a may be inserted into the first gear shaft 921 while the first gear shaft 921 is disposed between the first fixing bracket 913a and the second fixing bracket 913b, and the first idle gear 921a and the first sub gear 921b may be disposed. The first sub gear 921b may be disposed to be geared with the first internal gear 911_5. A portion of the second fixed cam 941b may be inserted into the second gear shaft 922 while the second gear shaft 922 is disposed between the first fixing bracket 913a and the second fixing bracket 913b, and the second idle gear 922a and the second sub gear 922b may be disposed. The second sub gear 922b may be disposed to be geared with the second internal gear 912_5. Accordingly, when the first rotation part 911 coupled to the first housing 110 or the second rotation part 912 coupled to the second housing 120 is rotated, the first internal gear 911_5 and the second internal gear 912_5 are rotated, and in correspondence, the first sub gear 921b geared with the first internal gear 911_5 and the second sub gear 922b geared with the second internal gear 912_5 may be rotated. The first gear shaft 921 and the second gear shaft 922 may be rotated in correspondence to rotation of the first sub gear 921b and the second sub gear 922b, and in correspondence, the first idle gear 921a and the second idle gear 922a are rotated, whereby the first main gear 931_2 and the second main gear 932_2, the first rotary shaft 931, in which the first main gear 931_2 is formed, and the second rotary shaft 932, in which the second main gear 932_2 may be rotated. As the first rotary shaft 931 and the second rotary shaft 932 are rotated, the first cam 951a and the second cam 951b are rotated, whereby cam operations may occur between the first fixed cam 941a and the first cam 951a and the second fixed cam 941b and the second cam 951b. Here, while the first cam 951a and the second cam 951b are rotated by the first rotary shaft 931 and the second rotary shaft 932, the first fixed cam 941a and the second fixed cam 941b may be linearly moved in the x axis direction along the first rotary shaft 931 and the first gear shaft 921, and the second rotary shaft 932 and the second gear shaft 922. The linear movements of first fixed cam 941a and the second fixed cam 941b may be symmetrical (opposite) to each other with respect to the y axis.

The above-described hinge structure 900 may firmly maintain coupling between the first rotation part 911 and the second rotation part 912, and the fixing brackets 913a and 913b, by applying the second rail 911_4 of the same structure as the first rail 911_3 and the fourth rail 912_4 of the same structure as the third rail 912_3. Furthermore, the above-described hinge structure 900 helps forces to interwork with each other with balance during a folding or unfolding operation by disposing the interworking gears 931_2, 932_2, 921a, and 921b, by which the forces are made to interwork with each other, at a center of the first fixing bracket 913a and the second fixing bracket 913b.

Figure 10:
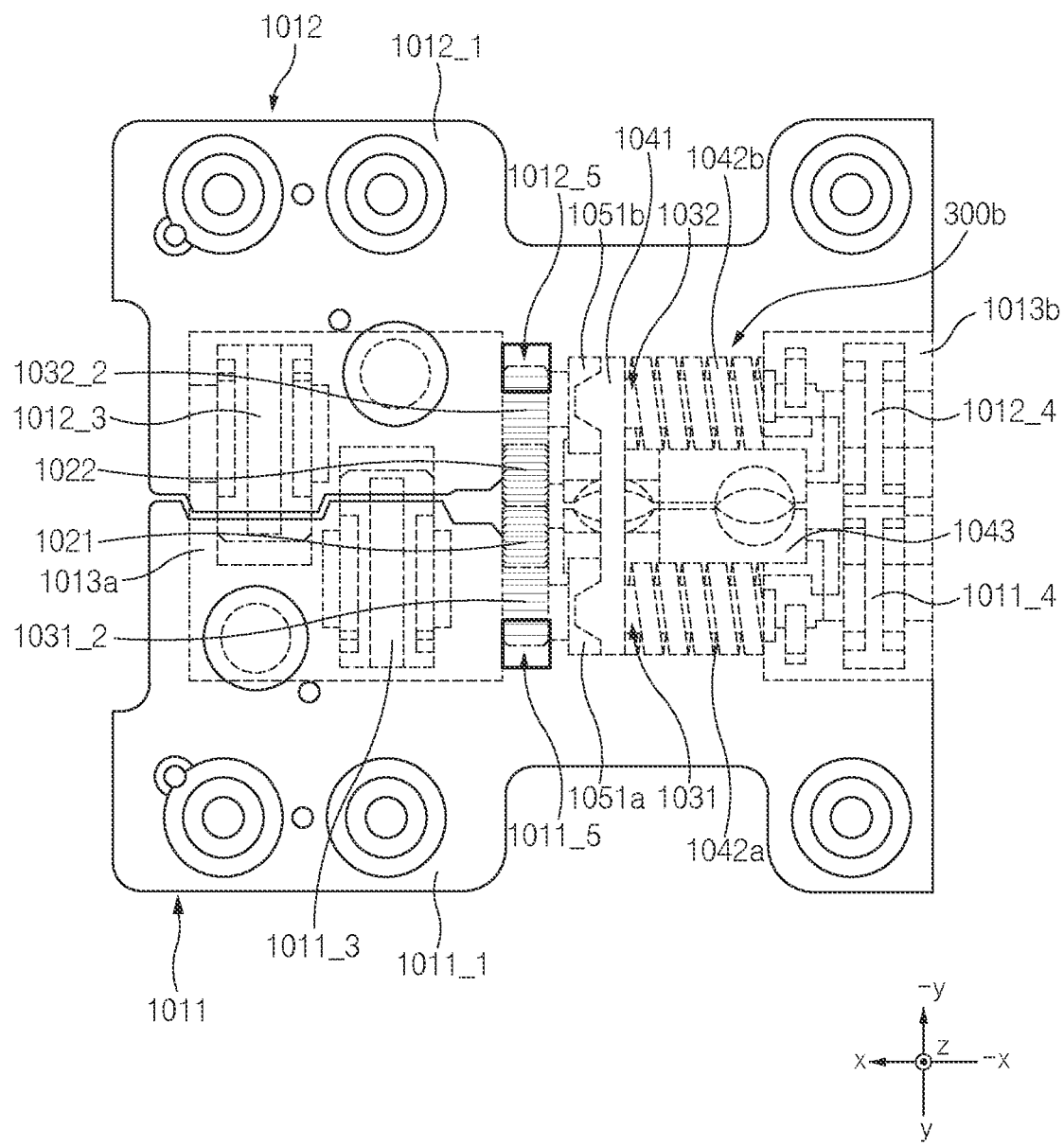
FIG. 10 is a diagram illustrating n example of a hinge structure having two fixing brackets according to various embodiments.

FIG. 10 is a diagram illustrating an example of a hinge structure having two fixing brackets according to various embodiments.

Referring to FIGS. 2 to 8 and 10, a hinge structure 1000 according to an embodiment may include a first rotation part 1011, a second rotation part 1012, a first fixing bracket 1013a, a second fixing bracket 1013b, and a torque generating structure 300b.

The first rotation part 1011 may include a first rotation body 1011_1, a first rail 1011_3, a second rail 1011_4, and a first internal gear 1011_5. The first rail 1011_3 and the second rail 1011_4 may have the same shapes as those of the first rail 1011_3 and the second rail 1011_4 of the first hinge structure 200a described above in FIGS. 4 and 5. For example, the second rail 1011_4 may have a structure obtained by cutting a portion of the first rail 1011_3. The first rail 1011_3 and the second rail 1011_4 may be rotated about the same operation axis. The first internal gear 1011_54 may be disposed to be biased toward the first rail 1011_3 or be disposed at an x axis central area of the first rotation body 1011_1.

The second rotation part 1012 may be disposed to be partially symmetrical (e.g., a location of the first rail 1011_3 in the first rotation body 1011_1 and a location of the third rail 1012_3 in the second rotation body 1012_1 are different) to the first rotation part 1011 with respect to the x axis. The second rotation part 1012, similarly to the first rotation part 1011, may include a second rotation body 1012_1, a third rail 1012_3, a fourth rail 1012_4, and a second internal gear 1012_5. The third rail 1012_3 and the fourth rail 1012_4 may have the same shapes as those of the third rail 1012_3 and the fourth rail 1012_4 of the first hinge structure 200a described above in FIGS. 4 and 5. The third rail 1012_3 and the fourth rail 1012_4 may be rotated about the same operation axis. The second internal gear 1012_5 may be disposed in an x axis central area of the second rotation body 1012_1.

The first fixing bracket 1013a may include a rail hole, into which the first rail 1011_3 of the first rotation part 1011 is inserted, a rail hole, into which the third rail 1012_3 of the second rotation part 1012 is inserted, and at least two holes used to fix the first fixing bracket 1013a to the hinge housing. Recesses, in which at least a portion of the torque generating structure 300b may be held, may be formed on a −x axis surface of the first fixing bracket 1013a. Because the first rail 1011_3 and the third rail 1012_3 are disposed to be adjacent to each other while being alternately disposed with respect to the x axis, a size of the first fixing bracket 1013a may be larger than a size of the second fixing bracket 1013b.

The second fixing bracket 1013b may include a common rail hole, into which the second rail 1011_4 of the first rotation part 1011 is inserted and into which the fourth rail 1012_4 of the second rotation part 1012 is inserted. A recess, in which at least a portion of the torque generating structure 300b is held, may be formed on an x axis surface of the second fixing bracket 1013b, and a center of the x axis surface may face one side of the center bracket 1043.

The torque generating structure 300b may include a first rotary shaft 1031, a second rotary shaft 1032, a fixed cam 1041, a first cam 1051a, a second cam 1051b, interworking gears 1031_2, 1021, 1022, and 1032_1, a first elastic member 1042a, and a second elastic member 1042b. The first main gear 1031_2 may be formed or disposed in the first rotary shaft 1031, and the first cam 1051a and one side (e.g., the first cam structure) of the fixed cam 1041, and the first elastic member 1042a may be inserted into the first rotary shaft 1031. The second main gear 1032_2 may be formed or disposed in the second rotary shaft 1032, and the second cam 1051b and an opposite side (e.g., the second cam structure) of the fixed cam 1041, and the second elastic member 1042b may be inserted into the second rotary shaft 1032. The first main gear 1031_2 may be geared with the first internal gear 1011_5 and the first idle gear 1021, the second main gear 1032_2 may be geared with the second internal gear 1012_5 and the second idle gear 1022, and the first idle gear 1021 and the second idle gear 1022 may be geared with each other.

The above-described hinge structure 1000 provides an environment, in which a length thereof in the x axis direction may be designed to be shorter as compared with the hinge structure 900 of FIG. 9 by coupling the third rail 1012_3 and the fourth rail 1012_4 to the common rail hole.

Figure 11:
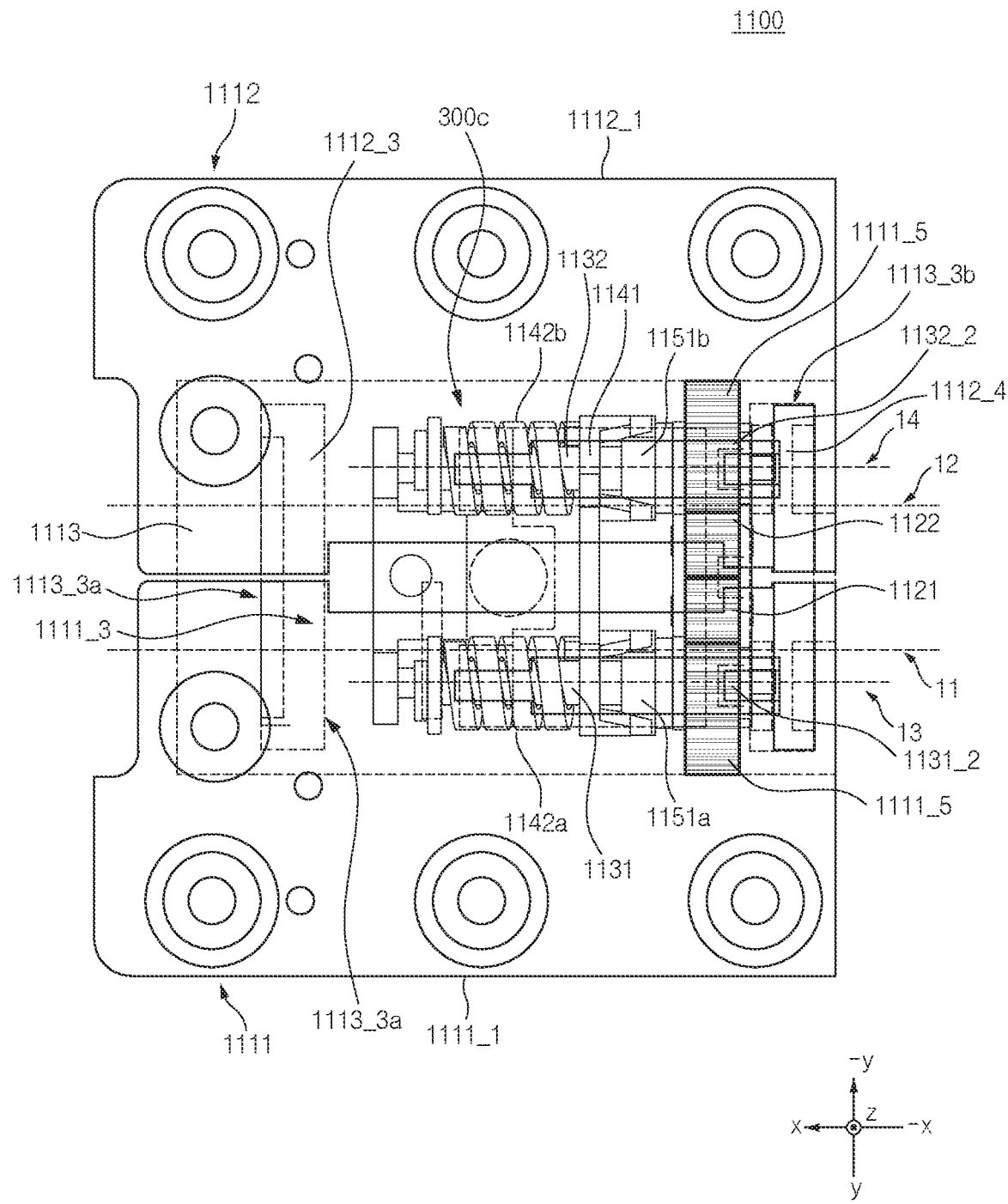
FIG. 11 is a diagram illustrating n example of a first hinge structure according to various embodiments.

FIG. 11 is a diagram illustrating an example of a first hinge structure according to various embodiments.

Referring to FIGS. 2 to 8 and 11, a hinge structure 1100 according to an embodiment may include a first rotation part 1111, a second rotation part 1112, a fixing bracket 1113, and a torque generating structure 300C.

The first rotation part 1111 may include a first rotation body 1111_1, a first rail 1111_3, a second rail 1111_4, and a first internal gear 1111_5. The first rail 1111_3 and the second rail 1111_4 may have the same shapes as those of the second rail 211_4 of the first hinge structure 200a described above in FIGS. 4 and 5, except for the x axis thickness. For example, the first rail 1111_3 and the second rail 1111_4 may have a shape obtained by cutting a portion of a half moon-shaped rail. The first rail 1111_3 and the second rail 1111_4 may be rotated about the same operation axis 11. The first internal gear 1111_5 may be disposed to be biased toward the second rail 1111_4.

The second rotation part 1112 may be disposed to be symmetrical (locations of the first rail and the third rail are different) to the first rotation part 1111 with respect to the x axis. The second rotation part 1112, similarly to the first rotation part 1111, may include a second rotation body 1112_1, a third rail 1112_3, a fourth rail 1112_4, and a second internal gear 1112_5. The third rail 1112_3 and the fourth rail 1112_4 may have the same shapes as those of the fourth rail 212_2 of the first hinge structure 200a described above in FIGS. 4 and 5. The third rail 1112_3 and the fourth rail 1112_4 may be rotated about the same operation axis 12. The second internal gear 1112_5 may be disposed to be biased to the −x axis edge of the second rotation body 1112_1 or to be closer to the fourth rail 1112_4 than to the third rail 1112_3.

The fixing bracket 1113 may include a first common rail hole 1113_3a, into which the first rail 1111_3 and the third rail 1112_3 are inserted, and a second common rail hole 1113_3b, into which the second rail 111_4 and the fourth rail 1112_4 are inserted, and may include a seating hole, in which the torque generating structure 300C may be seated at a central portion thereof. The first common rail hole 1113_3a may include a first rail 1111_3, and a guide that prevents and/or reduces separation of the third rail 1112_3. The first common rail hole 1113_3a may have a width corresponding to x axis thicknesses of the first rail 1111_3 and the third rail 1112_3. In the unfolded state of the foldable electronic device 100, sides of the first rail 1111_3 and the third rail 1112_3 disposed in the first common rail hole 1113_3a are adjacent to each other and may face each other. The second common rail hole 1113_3b may have the same structure as the common rail hole 213_4 described above in FIG. 4 and the like.

The torque generating structure 300C may include a first rotary shaft 1131, a second rotary shaft 1132, a fixed cam 1141, a first cam 1151a, a second cam 1051b, interworking gears 1131_2, 1121, 1122, and 1132_1, a first elastic member 1142a, and a second elastic member 1042b. The first main gear 1131_2 may be formed or disposed in the first rotary shaft 1131, and the cam 1151a and one side (e.g., the first cam structure) of the fixed cam 1141, and the first elastic member 1142a may be inserted into the first rotary shaft 1031. The second main gear 1132_2 may be formed or disposed in the second rotary shaft 1132, and the second cam 1051b and an opposite side (e.g., the second cam structure) of the fixed cam 1151, and the second elastic member 1042b may be inserted into the second rotary shaft 1141. The first main gear 1131_2 may be geared with the first internal gear 1111_5 and the first idle gear 1121, the second main gear 1132_2 may be geared with the second internal gear 1112_5 and the second idle gear 1122, and the first idle gear 1121 and the second idle gear 1122 may be geared with each other. The first rotary shaft 1131 may be rotated about the third axis 13, and the second rotary shaft 1131 may be rotated about the fourth axis 14.

The above-described hinge structure 1100 may reduce an x axis length of the fixing bracket 1113 by disposing the first rail 1111_3 and the second rail 1111_4 in the first common rail hole 1113_3a of the fixing bracket 1113, and in correspondence, may form the x axis lengths of the rotation parts 1111 and 1112 shorter.

Figure 12:
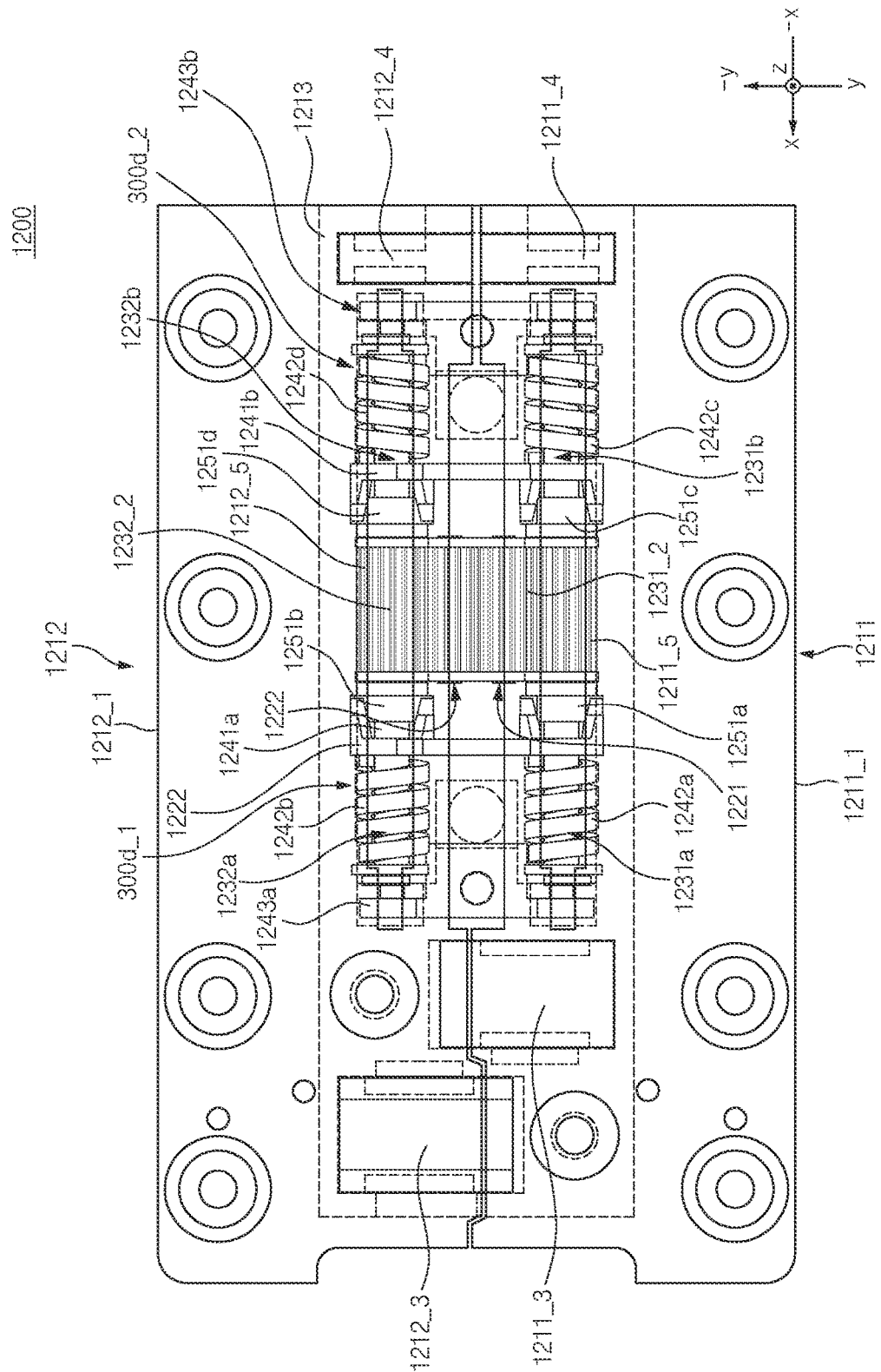
FIG. 12 is a diagram illustrating an example of a hinge structure including a plurality of cam structures according to various embodiments.

FIG. 12 is a diagram illustrating an example of a hinge structure including a plurality of cam structures according to various embodiments.

Referring to FIGS. 2 to 8 and 12, a hinge structure 1200 according to an embodiment may include a first rotation part 1211, a second rotation part 1212, a fixing bracket 1213, and torque generating structure (e.g., a first torque generating structure 300d_1 and a second torque generating structure 300d_2).

The first rotation part 1211 may include a first rotation body 1211_1, a first rail 1211_3, a second rail 1211_4, and a first internal gear 1211_5. The first rail 1211_3 and the second rail 1211_4 may have the same or similar shapes to those of the first rail 211_3 and the second rail 211_4 of the first hinge structure 200a described above in FIGS. 4 and 5, except for the x axis thickness. For example, the first rail 1211_3 may be a half moon-shaped rail, and the second rail 1211_4 may have a shape obtained by cutting a portion of the first rail 1211_3. The first internal gear 1211_5 may be disposed between the first rail 1211_3 and the second rail 1211_4.

The second rotation part 1212 may include a second rotation body 1212_1, a third rail 1212_3, a fourth rail 1212_4, and a second internal gear 1212_5. The third rail 1212_3 and the fourth rail 1212_4 may have the same or similar shapes to those of the third rail 212_3 and the fourth rail 212_4 of the first hinge structure 200a described above in FIGS. 4 and 5, except for the x axis thickness. Furthermore, the fourth rail 1212_4 may have a structure that is symmetrical to the second rail 1211_4 with respect to the x axis. The third rail 1212_3 may be disposed alternately with the first rail 1211_3, and when the foldable electronic device 100 is in the unfolded state, the fourth rail 1212_4 may be disposed in parallel (or continuous) to the second rail 1211_4 with respect to the y axis.

The fixing bracket 1213 may include a first rail hole, to which the first rail 1211_3 is coupled, a second rail hole to which the third rail 1212_3 is coupled and spaced apart from the first rail hole, and a common rail hole, into which the second rail 1211_4 and the fourth rail 1212_4, and may include a seating hole, in which the first torque generating structure 300d_1 and the second torque generating structure 300d_2 are seated at a central portion thereof. The fixing bracket 1213 has a larger length in the x axis direction as compared with the fixing bracket 213 described above in FIGS. 4 and 5, and may have a seating hole that is larger than the structure seating hole 213_2 of the fixing bracket 1213 such that the first torque generating structure 300d_1 and the second torque generating structure 300d_2 may be inserted therein.

The first torque generating structure 300d_1 may share the first main gear 1231_2 and the second main gear 1232_2 with the second torque generating structure 300d_2. The first torque generating structure 300d_1 may include a first rotary shaft 1231a disposed to be adjacent to the first rail 1211_3 and the third rail 1212_3, a second rotary shaft 1232a, a first fixed cam 1241a, a first cam 1251a, a second cam 1251b, a first elastic member 1242a, a second elastic member 1242b, and a first center bracket 1243a. The first rotary shaft 1231a may include a first column part disposed to extend from the first main gear 1231_2 in the x axis direction, and sides (e.g., the first cam structure) of the first cam 1251a and the first fixed cam 1241a, and sides of the first elastic member 1242a and the first center bracket 1243a may be inserted into the first column part. The second rotary shaft 1232a may include a second column part disposed to extend from the second main gear 1232_2 in the x axis direction, and opposite sides (e.g., the second cam structure) of the second cam 1251b and the first fixed cam 1241a, and sides of the second elastic member 1242b and the first center bracket 1243a may be inserted into the second column part. The second torque generating structure 300d_2, for example, may include a third rotary shaft 1231b disposed to be adjacent to the second rail 1211_4 and the fourth rail 1212_4, a fourth rotary shaft 1232b, a second fixed cam 1241b, a third cam 1251c, a fourth cam 1251d, a third elastic member 1242c, a fourth elastic member 1242d, and a second center bracket 1243d. The third rotary shaft 1231b may include a third column part disposed to extend from the first main gear 1231_2 in the −x axis direction, and sides (e.g., the third cam structure) of the third cam 1251c and the second fixed cam 1241b, and sides of the third elastic member 1242c and the second center bracket 1243b may be inserted into the third column part. The fourth rotary shaft 1232b may include a fourth column part disposed to extend from the second main gear 1232_2 in the −x axis direction, and opposite sides (e.g., the fourth cam structure) of the fourth cam 1251d and the second fixed cam 1241b, and opposite sides of the fourth elastic member 1242d and the second center bracket 1243b may be inserted into the fourth column part. The first main gear 1231_2 may be disposed between the first rotary shaft 1231a and the third rotary shaft 1231b. The first main gear 1231_2 may be geared with the first internal gear 1211_5 provided in the first rotation part 1211, and may be geared with the first idle gear 1221.

The second main gear 1232_2 may be disposed between the second rotary shaft 1232a and the fourth rotary shaft 1232b. The second main gear 1232_2 may be geared with the second internal gear 1212_5 provided in the second rotation part 1212, and may be geared with the second idle gear 1222. The first idle gear 1221 and the second idle gear 1222 may be geared with each other.

Because the first torque generating structure 300d_1 and the second torque generating structure 300d_2 are disposed in the hinge structure 1200 of the above-described structure, a high torque (or frictional force) may be generated using a relatively large number of elastic members. Accordingly, the hinge structure 1200 may firmly support a free-stop function of the foldable electronic device 100. Together with the various embodiments described above in FIGS. 8 to 12, force interlocking structures of various schemes may be provided by changing a cam, a frictional plate, a curling, a surface pressure of the torque generating structure.

Figure 13A:
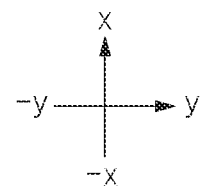
FIG. 13A is a diagram illustrating an example of a shape of a cam according to various embodiments.
Figure 13A:
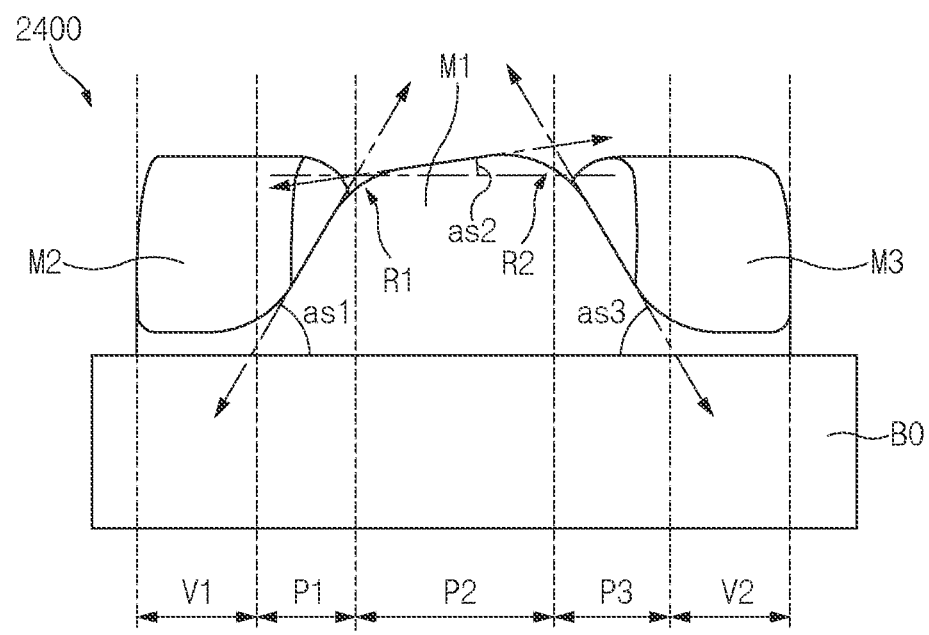
Figure 13B:
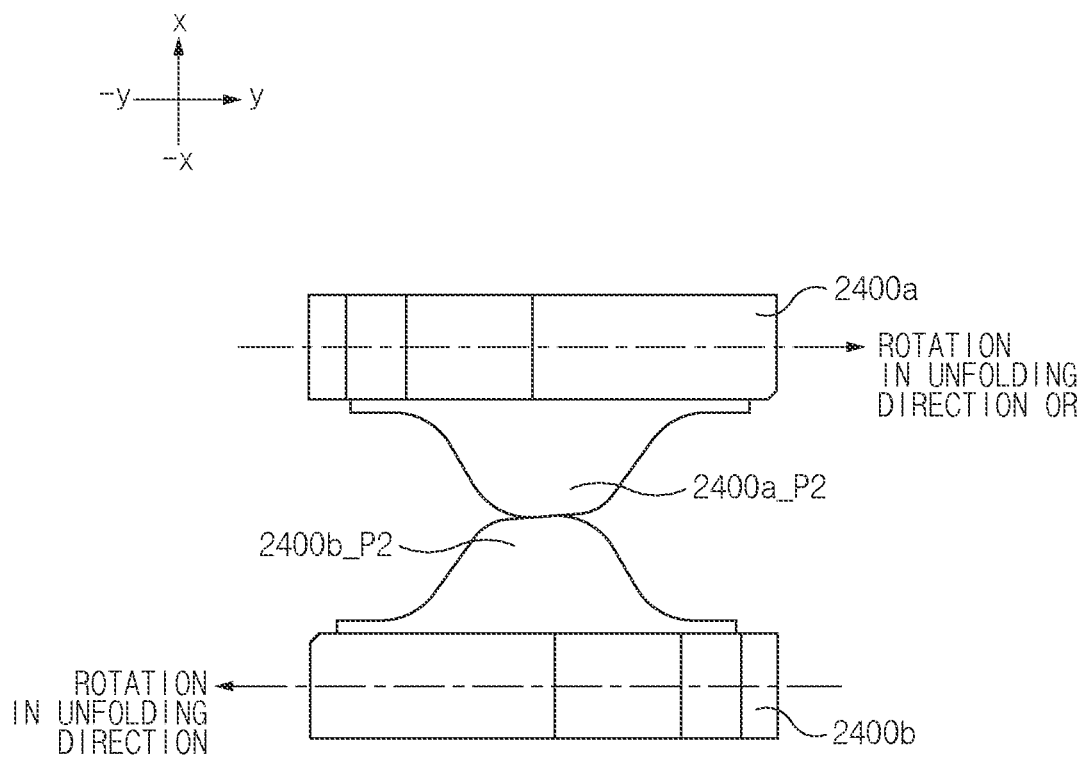
FIG. 13B is a diagram illustrating an example of a contact state of a cam and some mountains of a cam structure according to various embodiments.

FIG. 13A is a diagram illustrating an example of a shape of a cam according to various embodiments. FIG. 13B is a diagram illustrating an example of a contact state of a cam and various mountains of a cam structure according to various embodiments. Prior to a description, a cam 2400a according to an embodiment may be applied to at least one of the cam or the cam structure described above in FIGS. 2 to 12.

Referring to FIG. 13A, the cam 2400a (or the cam structure) according to the embodiment may include a cam support portion B0, a plurality of mountains M1, M2, and M3, and a plurality of valleys V1 and V2. Although the illustrated drawings suggest the cam 2400a including three mountains M1, M2, and M3 and three valleys V1 and V2 (a valley covered by the first mountain M1 is not illustrated), the disclosure is not limited thereto. For example, the cam 2400a may have a structure including two or more cams and valleys. All of the plurality of valleys M1, M2, and M3 may have the same structure. Furthermore, a mountain of at least one of the plurality of valleys M1, M2, and M3 may have formed that are different from those of the other mountains. For example, as illustrated, at least one mountain may have a structure, in which a second part P2 corresponding to the center of the mountain has a specific inclination angle (an inclination angle that is larger than 0, for example, around about 5 degrees), and at least one of the remaining mountains may have a structure, in which a central portion of the mountain is flat.

According to an embodiment, at least one mountain of the plurality of mountains M1, M2, and M3, for example, the first mountain M2, as illustrated, may include a first part P1 having a first inclination angle as1, a second part P2 having a second inclination angle as2, and a third part P2 having a third inclination angle as3. One side (e.g., a −y axis end) of the first part P1 is connected to one side (e.g., a y axis end) of the first valley V1, and an opposite side (e.g., a y axis end) of the first part P1 may be connected to one side (e.g., a −y axis end) of the second part P2. The first part P1, for example, may have a ridge line having the first inclination angle as1 with respect to the y axis. The first inclination angle as 1 may include an acute angle that is smaller than 90 degrees from the −y axis to the y axis direction with respect to the x axis.

One side (e.g., a −y axis end) of the second part P2 is connected to an opposite side (e.g., a y axis end) of the first part P1, and an opposite side (e.g., a y axis end) of the second part P1 may be connected to one side (e.g., a −y axis end) of the third part P3. The second part P2 may be disposed to protrude further than the first part P1 and the third part in the x axis direction. A border area of the first part P1 and the second part P2 may be rounded at a specific curvature R1. The second part P2 may have a second inclination angle as2 with respect to the y axis. The second inclination angle as2 may include an acute angle that is smaller than 90 degrees from the −y axis in the y axis direction with respect to the x axis, and an absolute angle of the second inclination angle as2 may be smaller than an absolute value of the first inclination angle as1.

One side (e.g., a −y axis end) of the third part P3 may be connected to an opposite side (e.g., a y axis end) of the second part P1, and an opposite side (e.g., a y axis end) of the third part P3 may be connected to one side (e.g., a −y axis end) of the second valley V2. The third part P3 may be formed to have a specific inclination that is inclined from the second part P2 in the y axis direction. A border area of the second part P2 and the third part P3 may be rounded at a specific curvature R2. The second curvature R2 may have a value (e.g., the first curvature R1 is smoother than the second curvature R2) that is smaller than the first curvature R1. The third part P2 may have a third inclination angle as3 with respect to the −y axis. The third inclination angle as3 may include an acute angle that is smaller than 90 degrees from the −y axis in the y axis direction with respect to the x axis, and an absolute angle of the third inclination angle as3 may be smaller than an absolute value of the second inclination angle as2. According to various embodiments, an absolute value of the third inclination angle as3 may be the same as or larger than the absolute value of the first inclination angle as1.

Referring to FIG. 13B, the cam shape described in FIG. 13A may be applied to the at least one cam or the at least one cam structure described above in FIGS. 2 to 12. For example, in the illustrated drawings, a protrusion of the cam 2400a may be disposed to protrude from the x axis in the −x axis direction, and a protrusion of the cam structure 2400b may be disposed to protrude from the −x axis in the x axis direction. Furthermore, a convexo-concave part of the cam 2400a and a convexo-concave part of the cam structure 2400b may be disposed to face each other. At least a portion of the second part 2400a_P2 of the cam 2400a and at least a portion of the second part 2400b_P2 of the cam structure 2400b, as illustrated, may contact each other in a free-stop section (a section, in which the electronic device is held at a specific angle range due to the friction of the cam 2400a and the cam structure 2400b) of the electronic device (e.g., the electronic device 100 of FIG. 2). According to an embodiment, when the electronic device is in a free-stop state, a repulsive force for restoring the display (the display 160 of FIG. 2) to the unfolding state may be shown.

According to an embodiment, the cam 2400a may be pushed in the y axis direction by a restoring force of the display (e.g., a repulsive force of the display is applied in the counter clockwise direction), and the cam structure 2400b may be pushed in the −y axis direction by a restoring force of the display (e.g., a repulsive force of the display is applied in the clockwise direction). In this process, because the second part 2400a_P2 of the cam 2400a and the second part 2400b_P2 of the cam structure 2400b contact each other while having the above-described second inclination angle as2, the cam 2400a and the cam structure 2400b of the disclosure may restrain pushing (e.g., an angle between the first housing (e.g., the first housing 110 of FIG. 2) and the second housing (e.g., the second housing 120 of FIG. 2) in the free-stop state, which may occur regardless of an intention of the user by offsetting at least a portion of the repulsive force (or the restoring force) generated in the unfolding direction of the display. According to various embodiments, the electronic device may have a holding state (or a free-stop state) of a specific angle. In this case, the electronic device, as illustrated, may be disposed such that the cam 2400a and the cam structure 2400b are engaged with each other, and may offset a force, by which the repulsive force or the restoring force is applied in the unfolded state. Although FIG. 13B illustrates an example structure, in which apex portions of the mountains of both of the cam 2400a and the cam structure 2400b have the second inclination angle as2, the disclosure is not limited thereto. For example, the second part P2 having the second inclination angle as2 may be formed in any one of the cam 2400a or the cam structure 2400b.

Meanwhile, although FIG. 13B is illustrated with respect to a direction, in which the cam 2400a is rotated from the −y axis (or the left side) in the y axis (or rightward) direction, the disclosure is not limited thereto. For example, according to a design layout of the electronic device, a direction, in which the cam 2400a is rotated from the y axis in the −y axis direction, may be a direction, in which the display is operated in the unfolded state, from the folded state. Furthermore, in the illustrated description, the structure, in which the cam 2400a is rotated in the y axis direction and the cam 2400b is rotated in the −y axis direction, has been described, but as described above, the cam disposed in the cam member may not be rotated but may be linearly moved. Accordingly, any one of the cam 2400a or the cam 2400b may be fixed, and the other may be rotated in the clockwise direction or the counterclockwise direction. In this case, an inclined surface, in which an inclination increases in a rotational direction that is opposite to a direction, in which the flexible display is to be unfolded, may be formed in the corresponding cams 2400a and 2400b.

According to various example embodiments, referring to at least one drawing of FIGS. 1A to 13B, and a related description thereof, an electronic device (or a portable electronic device, a portable communication device, a foldable electronic device, or a foldable electronic device having a communication function) may include: a first housing, a second housing, a hinge structure comprising a hinge connecting the first housing and the second housing, and a flexible display, at least a portion of which is positioned on the first housing, the second housing, and the hinge structure, the hinge structure may include a first rotation part coupled to the first housing and having a first gear on one side of the first rotation part, a second rotation part coupled to the second housing and having a second gear on one side of the second rotation part, a fixing bracket, to which the first rotation part and the second rotation part are coupled, and a structure, at least a portion of which is seated on one side of the fixing bracket, the structure may include a first rotary shaft, a second rotary shaft, a first main gear formed in the first rotary shaft, a second main gear formed in the second rotary shaft, and at least one idle gear disposed between the first main gear and the second main gear, wherein the first gear may be geared with the first main gear, and the second gar may be geared with the second main gear.

According to various example embodiments, a linear distance from a center of the first gear to an outside (an outer end of a gear tooth) of the first gear, on which a gear pattern is formed, is greater than a radius of the first main gear, and a linear distance from a center of the second gear to an outside (an outer end of a gear tooth) of the first gear, on which a gear pattern is formed, is greater than a radius of the second main gear.

According to various example embodiments, the radius of the first main gear and the radius of the second main gear may be greater than a radius of the at least one idle gear.

According to various example embodiments, a gear ratio of the first gear and the first main gear may be greater than a gear ratio of the first main gear and the at least one idle gear, and a gear ratio of the second gear and the second main gear may be greater than a gear ratio of the second main gear and the at least one idle gear.

According to various example embodiments, the first gear may be positioned on an upper side with respect to a transverse central line of the first main gear, and the second gear may be positioned on an upper side with respect to a transverse central line of the second main gear.

According to various example embodiments, the first gear may be positioned on a lower side of a transverse central line of the first main gear, and the second gear may be positioned on a lower side with respect to a transverse central line of the second main gear.

According to various example embodiments, the first gear may be disposed to be symmetrical to the second gear with respect to the fixing bracket.

According to various example embodiments, the first rotation part may include a first rail, at least a portion of which includes a curved surface, and a second rail disposed to be spaced apart from the first rail by a specific interval, the second rotation part may include a third rail, at least a portion of which includes a curved surface, and a fourth rail disposed to be spaced apart from the third rail by a specific interval, and the fixing bracket may include rail holes, to which the first rail, the second rail, the third rail, and the fourth rail are coupled.

According to various example embodiments, the first rail and the second rail may have a same operation axis and the third rail and the fourth rail may have a same operation axis.

According to various example embodiments, the first rail, the second rail, and the first gear may have a same operation axis, and the third rail, the fourth rail, and the second gear may have a same operation axis.

According to various example embodiments, the first gear may be disposed between the first rail and the second rail, and the second gear may be disposed between the third rail and the fourth rail.

According to various example embodiments, the first rail and the third rail may be disposed at different locations of the fixing bracket, and the second rail and the fourth rail may be disposed at locations of the fixing bracket, which are symmetrical to each other.

According to various example embodiments, the rail holes may include a first rail hole, to which the first rail is coupled, a second rail hole, to which the third rail is coupled, and a common rail hole, to which the second rail and the fourth rail are coupled.

According to various example embodiments, the second rail may have a shape obtained by cutting a portion of the first rail, and the fourth rail may have a shape obtained by cutting a portion of the second rail.

According to various example embodiments, the first rail and the third rail may be disposed at locations of the fixing bracket, which are symmetrical to each other, and the second rail and the fourth rail may be disposed at locations of the fixing bracket, which are symmetrical to each other.

According to various example embodiments, the rail holes may include a first common rail hole, to which the first rail and the third rail are coupled, and a second common rail hole, to which the second rail and the fourth rail are coupled.

According to various example embodiments, the first rail and the third rail may be disposed at different locations of the fixing bracket, and the second rail and the fourth rail may be disposed at different locations of the fixing bracket.

According to various example embodiments, the rail holes may include a first rail hole, to which the first rail is coupled, a second rail hole, to which the second rail is coupled, a third rail hole, to which the third rail is coupled, and a fourth rail hole, to which the fourth rail is coupled.

According to various example embodiments, the foldable electronic device may include: a first cam, at least portion of which is inserted into the first rotary shaft, a second cam, at least portion of which is inserted into the second rotary shaft, a fixed cam including a first cam structure inserted into the first rotary shaft, a second cam structure inserted into the second rotary shaft, and a connector connecting the first cam structure and the second cam structure, a first elastic member comprising an elastic material, at least a portion of which is inserted into the first rotary shaft, and configured to provide an elastic force to one side of the fixed cam or the first cam, and a second elastic member comprising an elastic material, at least a portion of which is inserted into the second rotary shaft, and configured to provide an elastic force to one side of the fixed cam or the second cam, and According to various example embodiments, a first axis corresponding to a center of a hinge operation of the first rotation part, a second axis corresponding to a center of a hinge operation of the second rotation part, a third axis corresponding to an operation axis of the first rotary shaft, and a fourth axis corresponding to an operation axis of the second rotary shaft may be formed, and an interval between the first axis and the second axis may be smaller than an interval between the third axis and the fourth axis.

Each of the elements (e.g., a module or a program) according to various embodiments may include a single or a plurality of entities, and some of the corresponding sub-elements may be omitted or another sub-element may be further included in various embodiments. Alternatively or additionally, some elements (e.g., a module or a program) may be integrated into one entity to perform functions performed by the corresponding elements before the integration in the same way or similarly. The operations performed by a module, a program module, or another element according to various embodiments may be executed sequentially, in parallel, repeatedly, or heuristically, or at least some operations may be executed in another sequence or may be omitted, or another operation may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A foldable electronic device comprising:
   a first housing and a second housing;
   a hinge structure connecting the first housing and the second housing; and
   a flexible display operatively associated with the hinge structure,
   wherein the hinge structure includes:
   a first rotation part, comprising a first rotation body, a first gear, and a first rail and coupled to the first housing;
   a second rotation part, comprising a second rotation body, a second gear, and a third rail and coupled to the second housing;
   a bracket, to which at least a portion of the first rotation part and at least a portion of the second rotation part are coupled;
   a first rotary shaft;
   a first elastic member, at least a portion of the first elastic member is inserted into the first rotary shaft,
   a second rotary shaft;
   a second elastic member, at least a portion of the second elastic member is inserted into the second rotary shaft,
   a first main gear concentric with and configured to rotate with the first rotary shaft;
   a second main gear concentric with and configured to rotate with the second rotary shaft; and
   a plurality of idle gears disposed between at least the first main gear and the second main gear,
   wherein the first gear is engaged with the first main gear and disposed between the first rail and the first elastic member, and
   wherein the second gear is engaged with the second main gear and disposed between the third rail and the second elastic member.

2. The foldable electronic device of claim 1, wherein a linear distance from a center of the first gear to an outside of the first gear, on which a gear pattern is formed, is greater than a radius of the first main gear, and
   wherein a linear distance from a center of the second gear to an outside of the second gear, on which a gear pattern is formed, is greater than a radius of the second main gear.

3. The foldable electronic device of claim 1, wherein a radius of the first main gear and the radius of the second main gear are greater than a radius of at least one of the plurality of idle gears.

4. The foldable electronic device of claim 1, wherein a gear ratio of the first gear and the first main gear is greater than a gear ratio of the first main gear and at least one of the plurality of idle gears, and
   wherein a gear ratio of the second gear and the second main gear is greater than a gear ratio of the second main gear and at least one of the plurality of idle gears.

5. The foldable electronic device of claim 1, wherein the first gear is positioned on an upper side with respect to a transverse central line of the first main gear, and
   wherein the second gear is positioned on an upper side with respect to a transverse central line of the second main gear.

6. The foldable electronic device of claim 1, wherein the first gear is positioned on a lower side with respect to a transverse central line of the first main gear, and
   wherein the second gear is positioned on a lower side with respect to a transverse central line of the second main gear.

7. The foldable electronic device of claim 1, wherein the first rotation part includes:
   the first rail, at least a portion of which includes a curved surface; and
   a second rail disposed to be spaced apart from the first rail by a specific interval,
   wherein the second rotation part includes:
   the third rail, at least a portion of which includes a curved surface; and
   a fourth rail disposed to be spaced apart from the third rail by a specific interval, and wherein the bracket is a fixing bracket and includes:
rail holes, to which the first rail, the second rail, the third rail, and the fourth rail are coupled.

8. The foldable electronic device of claim 7, wherein the first rail, the second rail, and the first gear disposed between at least the first rail and the second rail have a same operation axis, and
wherein the third rail, the fourth rail, and the second gear disposed between at least the third rail and the fourth rail have a same operation axis.

9. The foldable electronic device of claim 7, wherein the first rail and the third rail are disposed at different locations of the fixing bracket, and the second rail and the fourth rail are disposed at locations of the fixing bracket which are symmetrical to each other.

10. The foldable electronic device of claim 9, wherein the rail holes include:
a first rail hole, to which the first rail is coupled;
a second rail hole, to which the third rail is coupled; and
a common rail hole, to which the second rail and the fourth rail are coupled.

11. The foldable electronic device of claim 7, wherein the first rail and the third rail are disposed at locations of the fixing bracket which are symmetrical to each other, and the second rail and the fourth rail are disposed at locations of the fixing bracket which are symmetrical to each other.

12. The foldable electronic device of claim 11, wherein the rail holes include:
a first common rail hole, to which the first rail and the third rail are coupled; and
a second common rail hole, to which the second rail and the fourth rail are coupled.

13. The foldable electronic device of claim 7, wherein the first rail and the third rail are disposed at different locations of the fixing bracket, and the second rail and the fourth rail are disposed at different locations of the fixing bracket, and
wherein the rail holes include:
a first rail hole, to which the first rail is coupled;
a second rail hole, to which the second rail is coupled;
a third rail hole, to which the third rail is coupled; and
a fourth rail hole, to which the fourth rail hole is coupled.

14. The foldable electronic device of claim 1, comprising:
a first cam, at least a portion of which is coupled to the first rotary shaft, wherein at least part of the first rotary shaft is inserted into the first cam;
a second cam, at least a portion of which is coupled to the second rotary shaft, wherein at least part of the second rotary shaft is inserted into the second cam;
a fixing cam including a first cam structure coupled to the first rotary shaft, a second cam structure coupled to the second rotary shaft, and a connector connecting the first cam structure and the second cam structure;
wherein the first elastic member, comprising an elastic material, configured to provide an elastic force to a side of the fixed cam and/or the first cam, wherein at least a portion of the first rotary shaft is inserted into the first elastic member; and
wherein the second elastic member, comprising an elastic material, configured to provide an elastic force to a side of the fixed cam and/or the second cam, wherein at least a portion of the second rotary shaft is inserted into the second elastic member.

15. The foldable electronic device of claim 14, including a first axis corresponding to a center of a hinge operation of the first rotation part, a second axis corresponding to a center of a hinge operation of the second rotation part, a third axis corresponding to an operation axis of the first rotary shaft, and a fourth axis corresponding to an operation axis of the second rotary shaft are formed, and
wherein an interval between the first axis and the second axis is smaller than an interval between the third axis and the fourth axis.

16. A foldable mobile communication device comprising:
a first housing;
a second housing;
a flexible display; and
a hinge structure rotatably connected with the first housing and the second housing, and configured so that movement of the hinge structure is configured to cause at least a portion of the flexible display to move, the hinge structure including:
a first rotation part coupled with the first housing and including a first gear and a first rail;
a second rotation part coupled to the second housing and including a second gear and a second rail;
a bracket in which a portion of the first rotation part and a portion of the second rotation part are accommodated;
a first rotary shaft;
a first elastic member, at least a portion of the first elastic member is inserted into the first rotary shaft,
a second rotary shaft parallel to the first rotary shaft;
a second elastic member, at least a portion of the second elastic member is inserted into the second rotary shaft,
a first main gear disposed between the first rail and the first elastic member and engaged with the first gear;
a second main gear disposed between the second rail and the second elastic member and engaged with the second gear; and
at least one idle gear disposed between the first main gear and the second main gear and engaged with at least one of the first main gear or the second main gear.

17. The foldable mobile communication device of claim 16, wherein the first gear includes first gear-patterned portion formed on a first protrusion portion protruded from a periphery of the first rotation part, and wherein the second gear includes second gear-patterned portion formed on a second protrusion portion protruded from a periphery of the second rotation part.

18. The foldable mobile communication device of claim 17, wherein each of the first and second gear-patterned portions faces away from the flexible display.

19. The foldable mobile communication device of claim 17, wherein each of the first and second gear-patterned portions has a range between 90 degree to 180 degree.

20. The foldable mobile communication device of claim 16, wherein the first gear is disposed above a transversal central line of the first main gear, and the second gear is disposed above a transversal central line of the second main gear.

21. The foldable mobile communication device of claim 16,
wherein each of the first rail and the second rail includes a curved surface, and
wherein the bracket is a fixing bracket and includes a first rail hole and a second rail hole accommodating the first rail and the second rail, respectively, such that the first rotation part and the second rotation part rotates along the first rail hole and the second rail hole, respectively.

22. The foldable mobile communication device of claim 21, wherein one of the first rail and the second rail is located as closer to a specified edge of the fixing bracket than the other one of the first rail and the second rail is with respect to the specified edge.

* * * * *